(12) United States Patent
Kennedy et al.

(10) Patent No.: US 8,229,007 B2
(45) Date of Patent: *Jul. 24, 2012

(54) HIGH BANDWIDTH DATA TRANSPORT SYSTEM

(75) Inventors: Philip T. Kennedy, Cedar Rapids, IA (US); Bruce D. Melick, Cedar Rapids, IA (US); David M. Snyder, Cedar Rapids, IA (US); Leslie D. Baych, Cedar Rapids, IA (US); Gregory P. Probst, Iowa City, IA (US); Joseph A. Gerke, Ely, IA (US); Jon G. Stanford, Norway, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,020

(22) Filed: Apr. 5, 2011

(65) Prior Publication Data

US 2011/0188541 A1 Aug. 4, 2011

Related U.S. Application Data

(63) Continuation of application No. 12/141,973, filed on Jun. 19, 2003, now Pat. No. 7,944,979, which is a continuation of application No. 10/967,850, filed on Oct. 18, 2004, now Pat. No. 7,986,729, which is a continuation-in-part of application No. 10/427,039, filed on Apr. 30, 2003, now Pat. No. 7,376,191, which is a continuation-in-part of application No. 09/698,793, filed on Oct. 27, 2000, now Pat. No. 6,868,419, said application No. 10/967,850 is a continuation-in-part of application No. 09/698,793, filed on Oct. 27, 2000, now Pat. No. 6,868,419, said application No. 10/967,850 is a continuation-in-part of application No. 09/812,545, filed on Mar. 20, 2001, now Pat. No. 7,561,808.

(60) Provisional application No. 60/512,367, filed on Oct. 17, 2003, provisional application No. 60/376,592, filed on Apr. 30, 2002, provisional application No. 60/441,358, filed on Jan. 21, 2003, provisional application No. 60/162,094, filed on Oct. 28, 1999, provisional application No. 60/163,426, filed on Nov. 3, 1999, provisional application No. 60/220,749, filed on Jul. 26, 2000, provisional application No. 60/190,832, filed on Mar. 21, 2000.

(51) Int. Cl.
*H04L 27/00* (2006.01)
(52) U.S. Cl. ......... 375/259; 375/256; 375/260; 375/353
(58) Field of Classification Search .................. 375/219, 375/256, 259, 260, 353; 370/203–211
See application file for complete search history.

(56) References Cited

U.S. PATENT DOCUMENTS 5,418,721 A 5/1995 Arai et al.
(Continued)

FOREIGN PATENT DOCUMENTS

WO 0041383 7/2000
(Continued)

OTHER PUBLICATIONS

Search Report for co-pending PCT/US2007/083359 listing relevant art cited by the International Searching Authority.

*Primary Examiner* — Curtis Odom
(74) *Attorney, Agent, or Firm* — McKee, Voorhees & Sease, P.L.C.

(57) ABSTRACT

The present invention provides for a methods, system, and apparatus relating to data transmission. One method of the present invention includes representing data using at least one ultra wideband pulse, sending the at least one ultra wideband pulse over an electrically conductive guided media, and recovering the data from the at least one ultra wideband pulse. The present invention can be used in conjunction with telephony applications, cable TV applications, power line applications, fiber optic applications, and data bus applications.

22 Claims, 14 Drawing Sheets

U.S. PATENT DOCUMENTS

| | | |
|---|---|---|
| 5,677,927 A | 10/1997 | Fullerton et al. |
| 5,982,276 A | 11/1999 | Stewart |
| 6,118,794 A | 9/2000 | Cornfield et al. |
| 6,185,290 B1 | 2/2001 | Shaffer et al. |
| 6,192,068 B1 | 2/2001 | Fattouche et al. |
| 6,195,484 B1 | 2/2001 | Brennan, III et al. |
| 6,236,652 B1 | 5/2001 | Preston et al. |
| 6,430,208 B1 | 8/2002 | Fullerton et al. |
| 6,496,104 B2 | 12/2002 | Kline |
| 6,532,256 B2 | 3/2003 | Miller |
| 6,532,260 B2 | 3/2003 | Oi |
| 6,549,567 B1 * | 4/2003 | Fullerton ............ 375/219 |
| 6,700,939 B1 | 3/2004 | McCorkle et al. |
| 6,834,073 B1 | 12/2004 | Miller et al. |
| 7,013,145 B1 | 3/2006 | Centore, III |
| 7,376,191 B2 | 5/2008 | Melick et al. |
| 2001/0036183 A1 | 11/2001 | Melick et al. |
| 2003/0228005 A1 | 12/2003 | Melick et al. |
| 2004/0161064 A1 | 8/2004 | Brethour et al. |
| 2004/0233973 A1 | 11/2004 | Fullerton et al. |
| 2004/0247020 A1 | 12/2004 | Mills et al. |
| 2005/0069020 A1 | 3/2005 | Lakkis |
| 2005/0089083 A1 | 4/2005 | Fisher et al. |
| 2005/0131922 A1 | 6/2005 | Kennedy et al. |
| 2005/0180369 A1 | 8/2005 | Hansen et al. |
| 2007/0022444 A1 | 1/2007 | Santhoff |
| 2007/0025738 A1 | 2/2007 | Moore |
| 2007/0058693 A1 | 3/2007 | Aytur et al. |
| 2007/0147386 A1 | 6/2007 | Choi et al. |
| 2007/0248174 A1 | 10/2007 | Ghosh et al. |

FOREIGN PATENT DOCUMENTS

| | | |
|---|---|---|
| WO | 0054488 | 9/2000 |

* cited by examiner

HIGH BANDWIDTH DATA TRANSPORT SYSTEM

CROSS-REFERENCE TO RELATED APPLICATIONS

This application is a Continuation of U.S. Ser. No. 12/141,973 filed on Jun. 19, 2008, which is a continuation of U.S. Ser. No. 10/967,850 filed Oct. 18, 2004, which is a conversion of and claims priority to prior U.S. Provisional Patent Application, Ser. No. 60/512,367 entitled COUNTER PULSE HIGH BANDWIDTH DATA TRANSPORT SYSTEM filed on Oct. 17, 2003, which is herein incorporated by reference in its entirety. U.S. Ser. No. 10/967,850 is also a continuation-in-part of and claims priority to U.S. patent application, Ser. No. 10/427,039, entitled HIGH-BANDWIDTH DATA TRANSPORT SYSTEM, filed on Apr. 30, 2003, now U.S. Pat. No. 7,376,191, which was a conversion of 60/376,592 filed Apr. 30, 2002 and 60/441,358 filed Jun. 20, 2003, all of which are herein incorporated by reference in its entirety. U.S. Ser. No. 10/967,850 application is also a continuation-in-part and claims priority to U.S. Ser. No. 09/698,793 entitled METHOD OF TRANSMITTING DATA INCLUDING A STRUCTURED LINEAR DATABASE, filed on Oct. 27, 2000, now U.S. Pat. No. 6,868,419, which was a conversion of 60/162,094 filed Oct. 28, 1999, and 60/163,426 filed Nov. 3, 1999 and 60/220,749 filed Jul. 26, 2000, all of which are herein incorporated by reference in its entirety. U.S. Ser. No. 10/967,850 application is also a continuation-in-part of and claims priority to U.S. Ser. No. 09/812,545 entitled SYSTEM AND METHOD OF USING VARIABLE PULSES FOR SYMBOLOGY, filed on Mar. 20, 2001, which was a conversion of 60/190,832 filed Mar. 21, 2000 and which is herein incorporated by reference in its entirety.

FIELD OF THE INVENTION

The present invention relates generally to a system, method and apparatus for increasing the bandwidth of guided line networks using particular types of pulse transmissions, including an improvement which uses alternating counter pulse transmissions. In particular, the present invention relates to the use of pulses to transmit data over guided lines, such as, but not limited to, coaxial cable, telephone twisted pair, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc., and non-metallic mediums, such as but not limited to, the human body, etc., non-guided narrow band wireless carrier signals, or any combinations of the above, including hybrid networks which use the present invention in conjunction with fiber optic and/or non-guided wireless networks. The present invention includes an improvement in which alternating counter pulse transmissions are used.

PROBLEMS IN THE ART

There are several trends in society that are creating an unprecedented need for bandwidth by consumers and businesses. Some of these result from the advent of the "digital age." Today, digitally encoded music can be played on MP3 and Compact Disc (CD) players designed for portable use, in automobiles, and homes. Digitally encoded voice is commonplace technology for cell phones and other forms of wireless telephones. Digitally encoded video can be watched from Digital Versatile Disk players (DVD), Direct Broadcast Satellite (DBS) Receivers, Personal Video Recorders (TiVo), digital camcorders and High Definition Televisions (HDTV). In addition, machines using digitally encoded data, such as the Personal Computer, and game stations, such as, XBox, Playstation 2 and Nintendo 64 are now ubiquitous.

The rise of the Internet and networks has provided ubiquitous connectivity for businesses and consumers alike, but are being constrained by the lack of true broadband availability. In December 1995, there were 16 million Internet connections worldwide. By August of 2001, that number had grown to 513 million.

Also, the demand for broadband connectivity continues to grow. This is a result of the increased number of users accessing remote sources of digitally encoded data and data intensive applications. Initially, Internet content was largely text-based and provided limited amount of services. However, the Internet has grown to provide more bandwidth intensive content filled with pictures, graphics, and video clips. In the future, the increase of available bandwidth will enable higher quality Internet content such as full motion video, entertainment quality video, streaming video and audio.

Even though there is currently a glut of high-speed fiber optic backbone capacity, with an overall utilization rate of only 3% to 5%, the access network, or what is commonly referred to as the "first mile" or "last mile", simply cannot keep pace with the need and desire for higher speed access to larger amounts of digital information.

There are many individuals and organizations who view the need to provide broadband connectivity as a matter of national importance. The Technology Network (TechNet), an organization of CEOs from the nation's leading technology companies, has called on the federal government to adopt a goal of 100 megabits per second to 100 million homes and small businesses by 2010. TechNet states, "If most Americans had high speed Internet access, whether by wire line, wireless, satellite or cable, consumers could benefit from access to multimedia, interactive distance learning, increased telecommuting, higher productivity, easier interaction with government, improved health care services, and on-demand entertainment. Currently, the vast majority of so-called "broadband" connections (i.e. Cable Modem and DSL) operate at less than 2 megabytes per second.

The Internet currently is built with many components capable of providing bandwidth at very high data transmission rates. However, the major impediment to the delivery of high-bandwidth Internet content and services is the transmission constraints from the major Internet pipes to the customer's home or business, also known as the "last mile."

Today, there are four basic technologies used for "last mile" access: fiber, telephone twisted pair, cable, and wireless.

Even though fiber optic transmission lines can provide a significant amount of bandwidth, laying fiber to the home or business has proven to be too costly. Wireless is also an expensive access network solution, and the total available bandwidth is limited and shared. Currently, cable and telephone twisted pair access networks are limited by the physics of continuously oscillating radio frequency technology.

Not only are "last mile" wired and wireless networks constrained by the physics of continuously oscillating radio frequency technology, but so are local area networks (LANs) and buses.

Therefore, what is needed is a cost-effective solution that provides very high bandwidth for "last mile" access networks, buses, and LANs, which overcomes these problems, and other limitations of current technology.

FEATURES OF THE INVENTION

A general feature of the present invention is the provision of a system, method and apparatus for increasing the bandwidth of guided line mediums, which overcomes the problems found in the prior art.

A further feature of the present invention is the use of pulses, which are capable of being used for the transmission of data at a high rate over high attenuation and capacitance mediums.

A further feature of the present invention is the modulation of pulses by polarity.

A further feature of the present invention is the modulation of pulses by position in time.

A further feature of the present invention is the modulation of pulses by amplitude.

A further feature of the present invention is the modulation of pulses by frequency.

A further feature of the present invention is the modulation of pulses by phase.

A further feature of the present invention is the modulation of pulses by VP Encoding.

A further feature of the present invention is the modulation of multiple pulses with or without pulse compression methods.

A further feature of the present invention is the modulation of pulses by any combination of polarity, time, amplitude, frequency, and phase.

A further feature of the present invention is the encoding of data or symbols in Base 2 numbers of pulses.

A further feature of the present invention is the encoding of data or symbols in higher than Base 2 numbers of pulses.

A further feature of the present invention is simplex signaling.

A further feature of the present invention is half-duplex signaling.

A further feature of the present invention is full-duplex signaling.

A further feature of the present invention is synchronous signaling.

A further feature of the present invention is asynchronous signaling.

A further feature of the present invention is an enhanced broadband transmission system with a point-to-point topology.

A further feature of the present invention is an enhanced broadband transmission system using a loop topology.

A further feature of the present invention is an enhanced broadband transmission system that is designed for a single user access.

A further feature of the present invention is an enhanced broadband transmission system that is designed for multiple user access.

A further feature of the present invention is its deployment over "last mile" access network topologies.

A further feature of the present invention is a "last mile" access network configured as a telephone loop plant.

A further feature of the present invention is a telephone loop configured to use one wire of a telephone twisted pair for forward and the other for reverse.

A further feature of the present invention is a telephone loop configured to use both wires of a telephone twisted pair for multiplexed forward and reverse transmissions.

A further feature of the present invention is a "last mile" access network configured as a Cable TV network.

A further feature of the present invention is a "last mile" access network configured as a power distribution network.

A further feature of the present invention is its deployment over local area network (LANs) topologies.

A further feature of the present invention is its deployment over data bus topologies.

A further feature of the present invention is its deployment using any combination of "last mile" access network, LAN, and data bus topologies.

A further feature of the present invention is connection to a "last mile" access network, or LAN, or data bus using a single transmission medium.

A further feature of the present invention is connection to a "last mile" access network, or LAN, or data bus using a plurality of transmission mediums of a single type.

A further feature of the present invention is connection to a "last mile" access network, or LAN, or data bus using a plurality of transmission mediums of a plurality of types.

A further feature of the present invention is the use of un-bonded telephone twisted pair as a transmission medium.

A further feature of the present invention is the use of bonded telephone twisted pair as a transmission medium.

A further feature of the present invention is the use of coaxial cable as a transmission medium.

A further feature of the present invention is the use of power lines as a transmission medium.

A further feature of the present invention is the use of shielded pair wire as a transmission medium.

A further feature of the present invention is the use of metallic vehicle bodies and frames as a transmission medium.

A further feature of the present invention is the use of structural steel as a transmission medium.

A further feature of the present invention is the use of railroad rail as a transmission medium.

A further feature of the present invention is the use of reinforcing bar as a transmission medium.

A further feature of the present invention is the use of metallic water pipe or other forms of metallic pipeline transport as a transmission medium.

A further feature of the present invention is the use of metal desks as a transmission medium.

A further feature of the present invention is the use of computer backplanes as a transmission medium.

A further feature of the present invention is the use of drill stem as a transmission medium.

A further feature of the present invention is the use of other conductive medium as a transmission medium.

A further feature of the present invention is the use of combinations of above as a transmission medium.

A further feature of the present invention is the use of the human body as a broadband data bus transmission medium.

A further feature of the present invention is the use of a single frequency channel to transmit pulses.

A further feature of the present invention is the use of multiple frequency channels to transmit pulses.

A further feature of the present invention is the use of time division multiplexing for multiple channels, multiple users and/or multiple device access over a single frequency channel on individual or multiple transmission mediums.

A further feature of the present invention is the use of code division multiplexing for multiple channels, multiple users and/or multiple device access over a single frequency channel operating on individual or multiple transmission mediums.

A further feature of the present invention is the use of time division multiplexing for multiple channels, multiple users and/or multiple device access over multiple frequency channels operating on individual or multiple transmission mediums.

A further feature of the present invention is the use of code division multiplexing for multiple channels, multiple users and/or multiple device access over multiple frequency channels operating on individual or multiple transmission mediums.

A further feature of the present invention is the use of an individual or plurality of sub-carriers.

A further feature of the present invention is the use of public and private access codes.

A further feature of the present invention is the provision of high security through the low probability of intercept and detection characteristics of transmissions.

A further feature of the present invention is the provision of an efficient data encapsulation protocol.

A further feature of the present invention is the provision of a multiplexer.

A further feature of the present invention is the provision of a transceiver/processor.

A further feature of the present invention is the provision of intermediate field repeaters.

A further feature of the present invention is the provision of multiplexers, switches, intermediate field repeaters, routers, client transceiver/processors, and other devices that switch data as pulses.

A further feature of the present invention is the provision for a client device to operate as a "Home/PNA" local director.

A further feature of the present invention is the provision for a multiplexer that is configured operates as a "Home/PNA" remote director.

A further feature of the present invention is an enhanced broadband delivery system that is designed to operate as a unified messaging system.

A further feature of the present invention is an enhanced broadband delivery system in which multiplexers serve as a concatenation point for a unified messaging system.

A further feature of the present invention is the use of geo-position as a routing mechanism.

A further feature of the present invention is the use of printed and video bar codes as a pulsed telecommunication data source.

A further feature of the present invention is the inclusion of data and symbol compression methods and systems within the transport.

A further feature of the present invention is the inclusion of data and symbol encryption and other security methods and systems within the transport.

A further feature of the present invention is the inclusion of manual and automated transmission tuning and conditioning systems and methods.

A further feature of the present invention is the use of priority, service type, stream identification, destination address, intermediate address, origination address, protocol type, network conditions (blockage, availability, route costs, quality of service, etc.), security rules and other standard network routing and switching metrics to route and switch data.

A further feature of the present invention is the use of alternating counter pulses, which are capable of being used for the transmission of data at a high rate over high attenuation and capacitance mediums.

A further feature of the present invention is the use of alternating counter pulses for the purpose of channel conditioning.

A further feature of the present invention is the modulation of alternating counter pulses by position in time.

A further feature of the present invention is the modulation of alternating counter pulses by amplitude.

A further feature of the present invention is the modulation of alternating counter pulses using shape.

A further feature of the present invention is the modulation of alternating counter pulses using VP Encoding.

A further feature of the present invention is the modulation of alternating counter pulses by a combination of time shifting and/or amplitude and/or shape.

A further feature of the present invention is the encoding of data or symbols in Base 2 numbers of alternating counter pulses.

A further feature of the present invention is the encoding of data or symbols in higher than Base 2 numbers of alternating counter pulses.

A further feature of the present invention is simplex signaling using alternating counter pulses.

A further feature of the present invention is half-duplex signaling using alternating counter pulses.

A further feature of the present invention is full-duplex signaling using alternating counter pulses.

A further feature of the present invention is synchronous signaling using alternating counter pulses.

A further feature of the present invention is asynchronous signaling using alternating counter pulses.

A further feature of the present invention is an enhanced broadband transmission system with a point-to-point topology using alternating counter pulses.

A further feature of the present invention is an enhanced broadband transmission system using a loop topology using alternating counter pulses.

A further feature of the present invention is an enhanced broadband transmission system that is designed for a single user access using alternating counter pulses.

A further feature of the present invention is an enhanced broadband transmission system that is designed for multiple user access using alternating counter pulses.

A further feature of the present invention is its deployment over wired "last mile" access network topologies using alternating counter pulses.

A further feature of the present invention is a wired "last mile" access network configured as a telephone loop plant using alternating counter pulses.

A further feature of the present invention is a wired "last mile" access network configured as a Cable TV network using alternating counter pulses.

A further feature of the present invention is a wired "last mile" access network configured as a power distribution network using alternating counter pulses.

A further feature of the present invention is its deployment over local area network (LANs) topologies using alternating counter pulses.

A further feature of the present invention is its deployment over data bus topologies using alternating counter pulses.

A further feature of the present invention is its deployment using any combination of "last mile" access network, LAN, data bus topologies, and/or ultra wideband wireless networks using alternating counter pulses.

A further feature of the present invention is connection to a "last mile" access network, or LAN, or data bus using a plurality of transmission mediums of a single type using alternating counter pulses.

A further feature of the present invention is connection to a "last mile" access network, or LAN, or data bus using a plurality of transmission mediums of a plurality of types using alternating counter pulses.

A further feature of the present invention is the use of un-bonded telephone twisted pair as a transmission medium using alternating counter pulses.

A further feature of the present invention is the use of bonded telephone twisted pair as a transmission medium using alternating counter pulses.

A further feature of the present invention is the use of coaxial cable as a transmission medium using alternating counter pulses.

A further feature of the present invention is the use of power lines as a transmission medium using alternating counter pulses.

A further feature of the present invention is the use of shielded pair wire as a transmission medium using alternating counter pulses.

A further feature of the present invention is the use of metallic vehicle bodies and frames as a transmission medium using alternating counter pulses.

A further feature of the present invention is the use of structural steel as a transmission medium using alternating counter pulses.

A further feature of the present invention is the use of railroad rail as a transmission medium using alternating counter pulses.

A further feature of the present invention is the use of reinforcing bar as a transmission medium using alternating counter pulses.

A further feature of the present invention is the use of metallic water pipe or other forms of metallic pipeline transport as a transmission medium using alternating counter pulses.

A further feature of the present invention is the use of metal desks as a transmission medium using alternating counter pulses.

A further feature of the present invention is the use of computer backplanes as a transmission medium.

A further feature of the present invention is the use of drill stem as a transmission medium using alternating counter pulses.

A further feature of the present invention is the use of other conductive medium as a transmission medium using alternating counter pulses.

A further feature of the present invention is the use of wireless ultra wideband radio frequency signals as a transmission medium using alternating counter pulses.

A further feature of the present invention is the use of combinations of above as a transmission medium using alternating counter pulses.

A further feature of the present invention is the use of a single frequency channel to transmit alternating counter pulses.

A further feature of the present invention is the use of multiple frequency channels to transmit alternating counter pulses.

A further feature of the present invention is the use of time division multiplexing for multiple channels, multiple users and/or multiple device access over a single frequency channel on individual or multiple transmission mediums using alternating counter pulses.

A further feature of the present invention is the use of code division multiplexing for multiple channels, multiple users and/or multiple device access over a single frequency channel operating on individual or multiple transmission mediums using alternating counter pulses.

A further feature of the present invention is the use of time division multiplexing for multiple channels, multiple users and/or multiple device access over multiple frequency channels operating on individual or multiple transmission mediums using alternating counter pulses.

A further feature of the present invention is the use of code division multiplexing for multiple channels, multiple users and/or multiple device access over multiple frequency channels operating on individual or multiple transmission mediums using alternating counter pulses.

A further feature of the present invention is the use of public and private access codes using alternating counter pulses.

A further feature of the present invention is the provision of high security through the low probability of intercept and detection characteristics of transmissions using alternating counter pulses.

A further feature of the present invention is the provision of a multiplexer using alternating counter pulses.

A further feature of the present invention is the provision of a transceiver/processor using alternating counter pulses.

A further feature of the present invention is the provision of intermediate field repeaters using alternating counter pulses.

A further feature of the present invention is the provision of multiplexers, switches, intermediate field repeaters, routers, client transceiver/processors, and other devices that switch data using alternating counter pulses.

A further feature of the present invention is the provision for a client device to operate as a "Home/PNA" local director using alternating counter pulses.

A further feature of the present invention is the provision for a multiplexer that is configured operates as a "Home/PNA" remote director using alternating counter pulses.

A further feature of the present invention is an enhanced broadband delivery system that is designed to operate as a unified messaging system using alternating counter pulses.

A further feature of the present invention is enhanced broadband delivery systems in which multiplexers serve as a concatenation point for a unified messaging system using alternating counter pulses.

A further feature of the present invention is the use of geo-position as a routing mechanism using alternating counter pulses.

A further feature of the present invention is the use of printed and video bar codes as a pulsed telecommunication data source using alternating counter pulses.

A further feature of the present invention is the inclusion of data and symbol compression methods and systems within the transport using alternating counter pulses.

A further feature of the present invention is the inclusion of data and symbol encryption and other security methods and systems within the transport using alternating counter pulses.

A further feature of the present invention is the inclusion of manual and automated transmission tuning and conditioning systems and methods using alternating counter pulses.

A further feature of the present invention is the use of priority, service type, stream identification, destination address, intermediate address, origination address, protocol type, network conditions (blockage, availability, route costs, quality of service, etc.), security rules and other standard network routing and switching metrics to route and switch data using alternating counter pulses.

One or more of these and/or other objects, features, or advantages of the present invention will become apparent from the specification and claims that follow.

SUMMARY OF THE INVENTION

The present invention is a system, method and apparatus for increasing the bandwidth of guided line networks using ultra wideband pulse transmissions. The ultra wideband pulses of the present invention are short, low duty cycle. These ultra wideband pulses enable a high data rate over increased distances on metallic or other electrically conductive mediums, including, but not limited to fast rise time, ultra-wide frequency spread, unique time domain and frequency domain signatures, etc. The ultra wideband pulses of the present invention exhibit a unique time domain signature and wideband frequency domain signature.

The present invention includes the use of ultra wideband pulses to transmit data over electrically conductive guided lines, such as, but not limited to, coaxial cable, telephone twisted pair, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc., and non-metallic mediums, such as but not limited to, the human body, etc., or any combinations of the above.

According to one aspect of the invention, a method is provided for operating in a public switched telephone network (PSTN). Ultra wideband pulses are transmitted and received near, or in the noise range of the PSTN network, which may also be providing other services such as voice, video, and data, by means other than the ultra wideband pulses of the present invention. In addition, a plurality of applications and components are provided that are used for the support, operation, management and delivery of services and products.

According to another aspect of the present invention, a method is provided for operating in a Cable Television (CATV) network. Within this embodiment, ultra wideband pulses are transmitted and received near, or in the noise range of the CATV network, which may also be providing other services such as voice, video, and data by means other than the ultra wideband pulses of the present invention.

According to another aspect of the present invention, a method is provided for operating with a LAN, which transmits and receives ultra wideband pulses operating near, or in the noise range of the LAN network, which may be running voice, video, and data traffic by means other than the ultra wideband pulses of the present invention.

According to another aspect of the present invention, a method is provided for use with a data bus, which transmits and receives ultra wideband pulses operating near, or in the noise range of the data bus, which may be running voice, video, and data traffic by means other than the ultra wideband pulses of the present invention.

According to another aspect of the invention, a method is provided for operating in a public switched telephone network (PSTN). Alternating counter pulses are transmitted and received near, or in the noise range of the PSTN network, which may also be providing other services such as voice, video, and data, by means other than the alternating counter pulses of the present invention. In addition, a plurality of applications and components are provided that are used for the support, operation, management and delivery of services and products.

According to another aspect of the present invention, a method is provided for operating in a Cable Television (CATV) network. Within this embodiment, alternating counter pulses are transmitted and received near, or in the noise range of the CATV network, which may also be providing other services such as voice, video, and data by means other than the alternating counter pulses of the present invention.

According to another aspect of the present invention, a method is provided for operating with a LAN, which transmits and receives alternating counter pulses operating near, or in the noise range of the LAN network, which may be running voice, video, and data traffic by means other than the alternating counter pulses of the present invention.

According to another aspect of the present invention, a method is provided for use with a data bus, which transmits and receives alternating counter pulses operating near, or in the noise range of the data bus, which may be running voice, video, and data traffic by means other than the alternating counter pulses of the present invention.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE PRESENT INVENTION

Figure 1A:
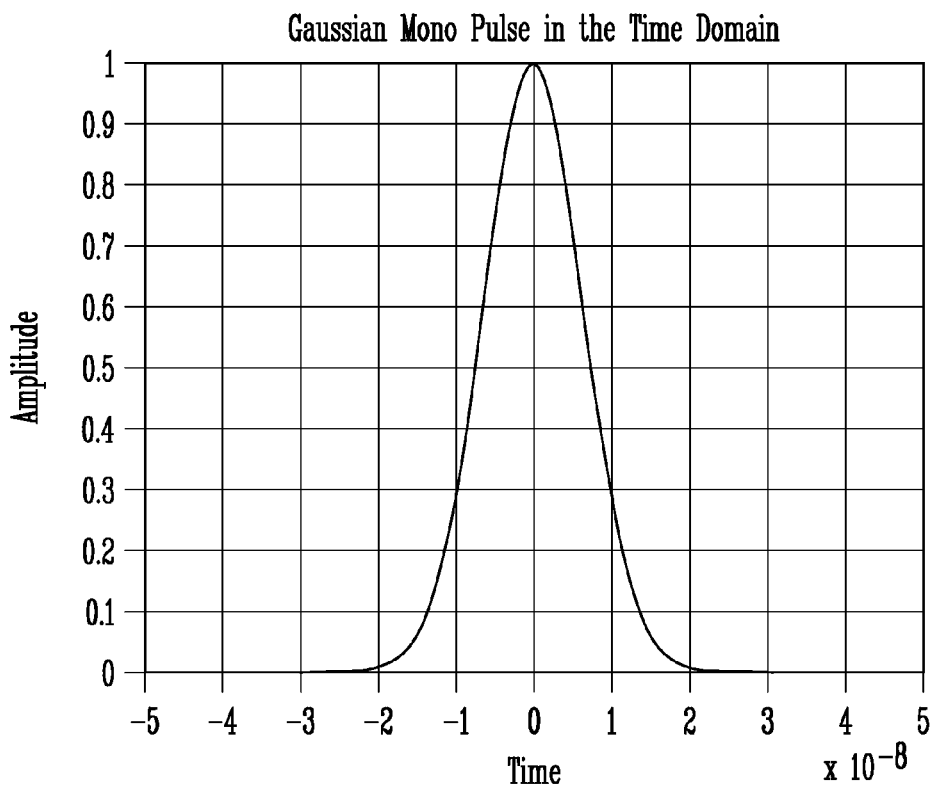
FIG. 1A is a graph of a Gaussian mono pulse in the time domain.
Figure 1B:
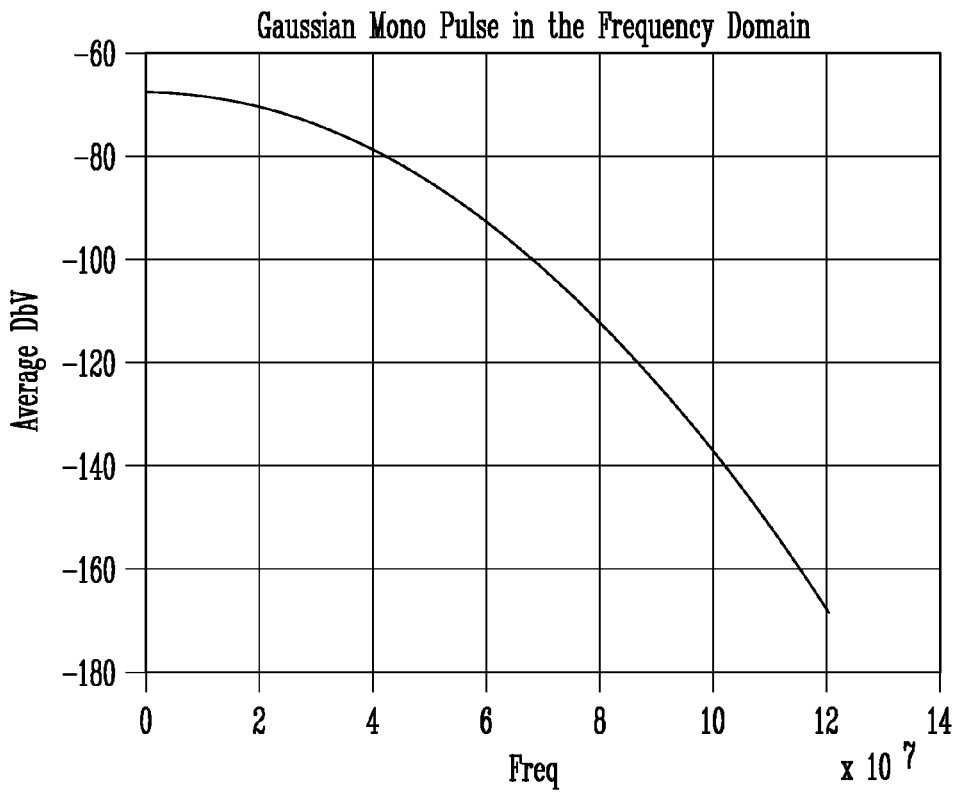
FIG. 1B is a graph of a Gaussian mono pulse in the frequency domain.
Figure 1C:
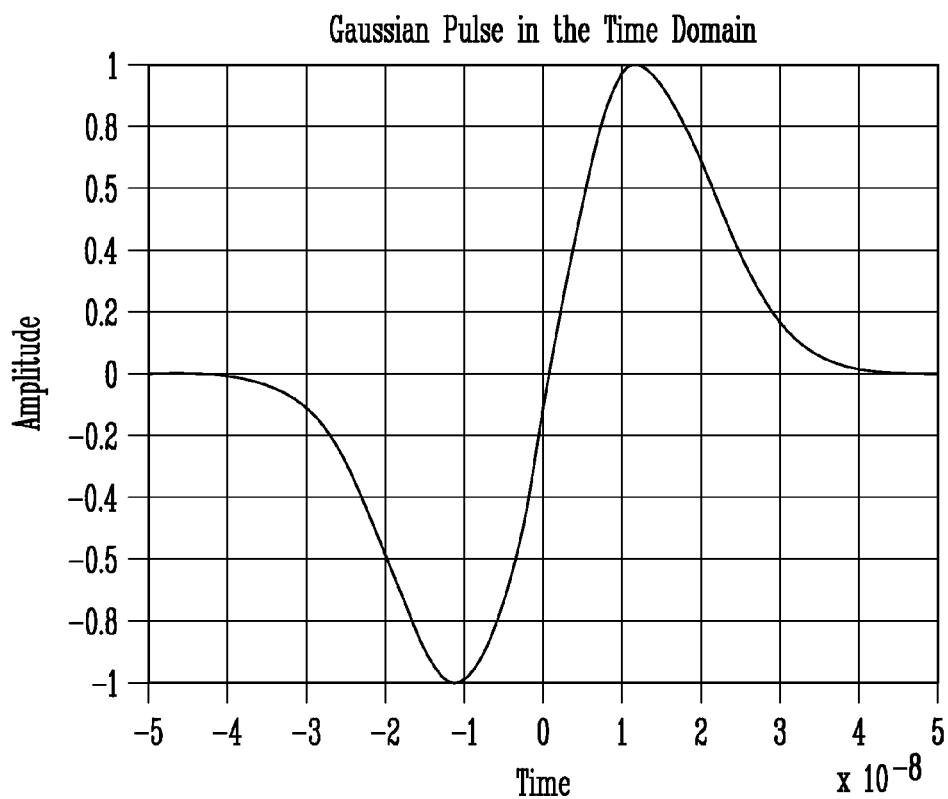
FIG. 1C a graph of a Gaussian pulse in the time domain.
Figure 1D:
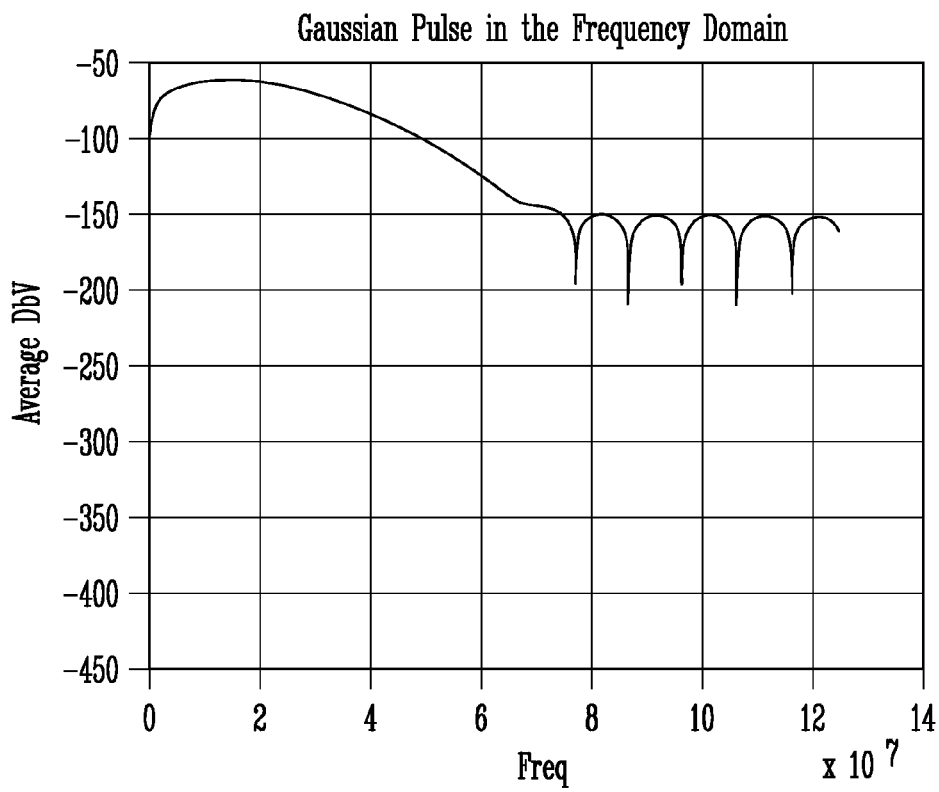
FIG. 1D is a graph of a Gaussian pulse in the frequency domain.
Figure 1E:
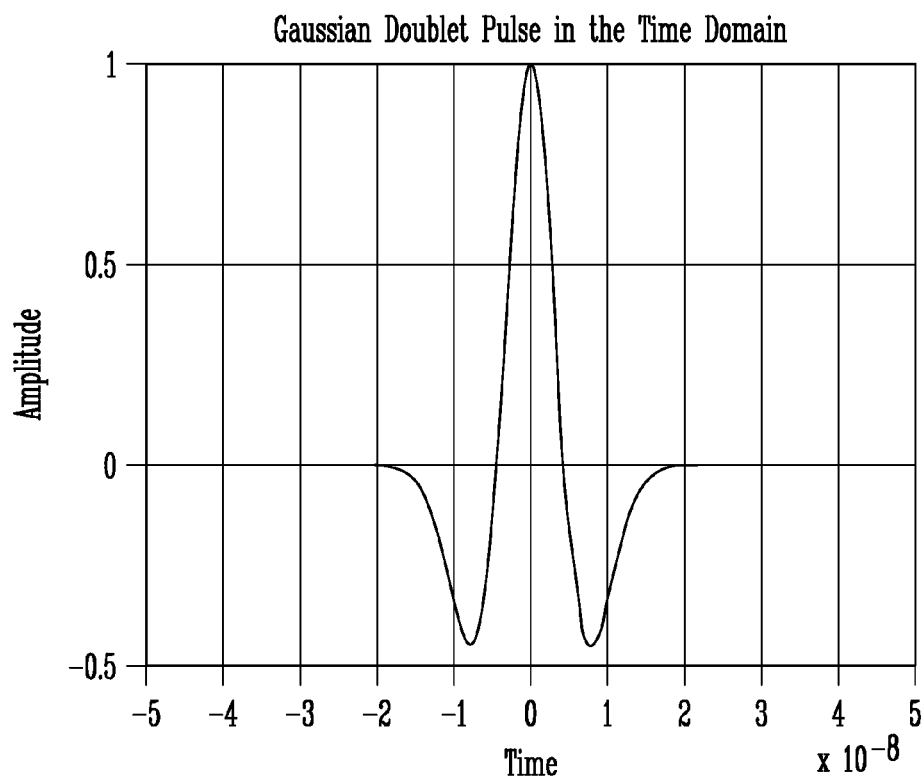
FIG. 1E a graph of a Gaussian doublet pulse in the time domain.
Figure 1F:
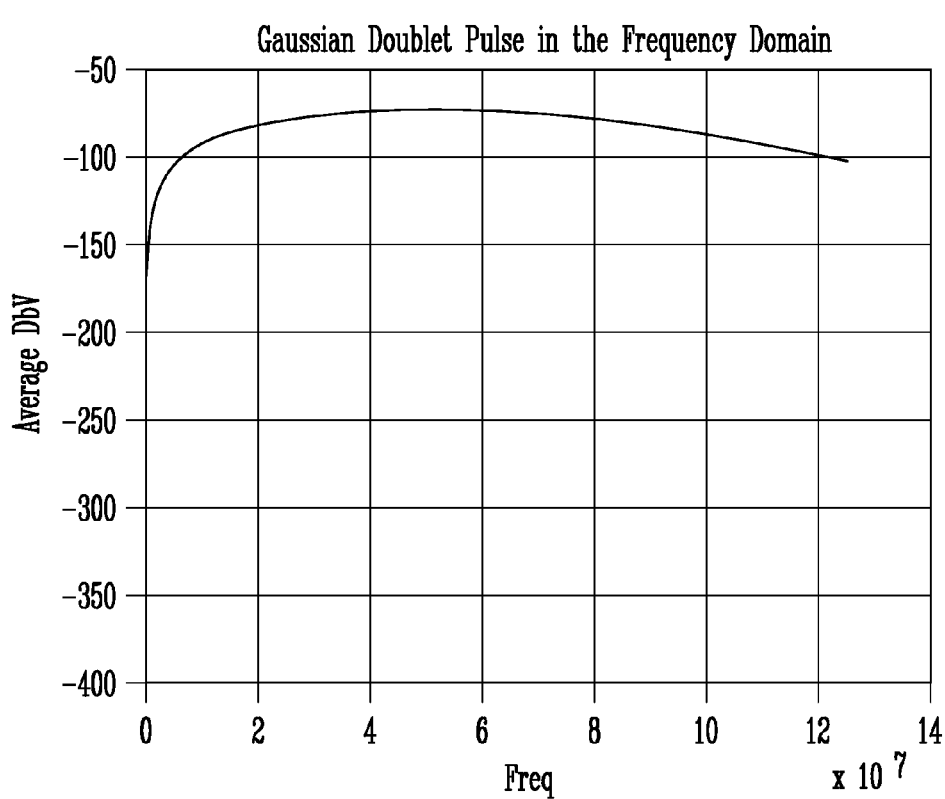
FIG. 1F is a graph of a Gaussian doublet pulse in the frequency domain.

The present invention is a departure from existing impulse radio techniques used for wireless transmission of data. In order to introduce the reader to the present invention, the following technology overview is provided as a precursor to the specific embodiments of the present invention. The intention of this overview is to assist the reader with the understanding of the present invention, and should not be used to limit the scope of the present invention.

One aspect of the present invention refers to a radio frequency system designed for use in high attenuation and capacitance environments which are commonly found on metallic guided-line conductors, such as but not limited to, telephone twisted pair, coaxial cable, Category 5 cable, power lines, other conductive mediums, such as but not limited to, metallic car and truck bodies, ship and submarine hulls, decks and bulkheads, aircraft fuselages, structural steel, missile bodies, tank bodies, water pipes, etc. The term "electrically conductive guided media" is used to include the above mentioned metallic guided-media conductors while excluding transmissions over the air or optical transmissions either over the air via laser or view optical fiber.

The pulses of the present invention are short, low duty cycle pulses. The duration and duty cycle of the pulses vary with the particular medium being used. For a guided media such as telephone twisted pair the practical range of duration of the center channel frequency of the pulses is between 300 KHz and 150 MHz, which equate to pulse durations of 2650 nanoseconds to 6.67 nanoseconds respectively. The upper center channel frequency on telephone twisted pair is limited by the phenomenon of radiation which begins to occur around 100 MHz. The overall duty cycle per unit of time is variable, and is dependant on the product of the pulse repetition frequency times a given pulse duration. The minimum practical pulse repetition frequency is dependant on the acceptable jitter for a given window of time. The length of the telephone twisted pair loop also plays a factor in which center channel frequency is used to achieve the maximum data rate at any particular transmission distance. The longer the loop, the lower the acceptable pulse center channel frequency.

For a guided media such as a coaxial cable the practical range of duration of the center channel frequency of the pulses is between 300 KHz and up to 2 GHz, which equate to pulse durations of 2650 nanoseconds to 0.50025 nanoseconds. One skilled in the art will recognize that the appropriate center channel frequency is dependant on the gauge, or mixture of gauges, of the guided medium, the proximity to sources of interference, the quality of the insulation, grounding, whether or not the cable is shielded, and other factors such may exist in a particular application or environment.

These pulses are ultra wideband, and may be based on the Gaussian waveform, which are not gated sine waves, and various derivatives including, but not limited to, a first derivative Gaussian mono-pulse, a second derivative Gaussian doublet, etc., or combinations of one or more of these pulses.

These pulses can also be formed by one or more waveforms that produce desired characteristics including, but not limited to fast rise time, ultra-wide frequency spread, unique time domain and frequency domain signatures, etc. The pulses exhibit a unique time domain signature and wideband frequency domain signature. The present invention's time domain signature is a result of the time shift keying of periodic pulses, which have well-defined zero crossing and peaks. The present invention's pulses are recovered in the time domain by searching for the location of a specific amount of energy in a sample window. The sent and received pulses are a time reference against which other pulses are measured.

The present invention may also employ an alternating counter pulse method in which alternating counter pulses of any type are used to reduce inter-symbol interference, shorten the channel, and provide a signal integrity that may results in higher data rates and a lower bit error rate (BER).

The frequency domain signature is ultra wideband in nature because fast rise time pulses are used. The pulses are therefore transmitted over a huge spread of frequency, and narrow-band, periodic signals are therefore excluded from consideration, including frequency domain signatures of sine-based waveforms, sawtooth waveforms, triangular waveforms, square waveforms, gated sine waveforms, and variants of those waveforms.

The pulse characteristics enable increased distance and data throughput performance of the system over existing technologies. Particular attention must be paid to the radiation of the pulse energy in unshielded metallic environments, such as telephone twisted pairs. For example, radiation occurs at approximately 100 MHz on a telephone twisted pair, which means relatively wide pulses, compared to those used over air, or a coaxial cable, must be designed for use in this high attenuation, high capacitance medium.

The advantage of the pulses of the present invention is their unique time domain signature. This signature enables a receiving device to determine the location of a pulse through a process called correlation. Correlation indicates a coincidence of energy when a replica of the sent pulse is multiplied by a received pulse signal. This coincidence known as the auto-correlation (a form of correlation), enables the detection of the pulse position in very specific time locations. The correlation process is used to detect pulses at very low signal to noise (SNR) levels, even down into the noise floor. The detection of these low SNR level signals is possible due to the coincidence of energy versus the signal with respect to noise.

There are two advantages of these pulses in the frequency domain: the ability to coexist with existing telecommunications technologies on copper wires, and the ability to filter and correlate the received signal.

A pulse of the present invention spreads energy to beyond 25% of the center frequency which causes the signal to appear as noise to most narrowband, wave-oriented communication systems. On a telephone loop, this characteristic limits the far-end and near-end crosstalk interference with other technologies operating on adjacent wires. In addition, this characteristic allows pulse-based services of the present invention to co-exist on the same wire operating with other services such as, but not limited to voice, DSL, etc.

The pulses illustrated in FIGS. 1a-1f are spread in frequency in excess of 400% of the center frequency. The pulses of the present invention create power spectra that are dramatically wider than traditional spread spectrum technologies, which allow signals to be transmitted faster and further than traditional narrowband methods.

In addition, the pulses of the present invention may be shaped spectrally to control the signal bandwidth, limit out of band emissions, in-band spectral flatness, time domain peak power, or adequate on-off attenuation ratios, etc. The pulses may be produced by various methods that are known to one of ordinary skill in the art.

The system of the present invention can also be used to transmit one or more data bits per pulse, or may use multiple pulses to transmit a single data bit. An uncoded, unmodulated pulse train containing a regularly occurring pattern of pulses will produce in the frequency domain a set of comb lines within the power spectrum of a single pulse. These comb lines identify areas of peak power and can cause interference with other services transmitting on the same or nearby wire.

In order to reduce the areas of peak power noted in the comb lines above, the energy can be spread more uniformly by using pseudo-random noise (PN) codes to dither each pulse in a pulse train relative to each pulse's nominal position. A PN code is a set of time positions that define the positioning for each pulse in a sequence of pulses.

The PN code can also be used to provide a method of establishing independent communication channels for multiple users, or devices operating over a single metallic medium. Multiple users, or devices, operating random individual clocks and different PN codes can be designed to have low cross correlation. Therefore, a pulse train using one PN code will statistically seldom collide with pulses using another PN code.

In addition to PN codes, there are other methods of channelization on the same metallic medium, such as, but not limited to time division multiplexing, frequency division multiplexing, etc.

Any characteristics or combinations of characteristics, of pulse waveforms can be modulated to convey information. These include, but are not limited to, amplitude modulation, phase modulation, frequency modulation, time shift modulation, polarity (flip) modulation, M-ary, and those described in U.S. patent application Ser. No. 09/812,545, to Melick, et al, entitled SYSTEM AND METHOD OF USING VARIABLE PULSES FOR SYMBOLOGY and U.S. Continuation-in-Part Patent Application filed on Oct. 18, 2004, to Melick et al, entitled SYSTEM AND METHOD OF USING VARIABLE PULSES FOR SYMBOLOGY, both which are herein incorporated in entirety by their reference. Modulation may be in either analog or digital forms.

One simple form of modulation is binary phase modulation which may be used to transmit binary information. Binary phase modulation uses a single symbol to convey a binary "1" when its pulse is transmitted in a specified phase and a binary "0" when its pulse is transmitted in a phase shifted 180 degrees. As an example, a series of binary phase modulated pulses transmitted at a frequency of 10 MHz sends 10 million pulses per second, yielding a symbol or data transmission rate of 10 Mbps.

A number of M-ary modulation methods (where M equals number of bits per symbol) provide for further data throughput capacity due to modulation. A 4-ary modulation method defines unique locations of the pulse center for each symbol. One method of M-ary modulation used for wireless ultra-wideband is called pulse positioning modulation (PPM.) The normal implementation of PPM uses a nominal location to indicate the expected arrival position or time of a pulse. A PPM transmitter delays or advances the pulse by a constant amount of time from its nominal position in order to modulate information. A PPM receiver simply evaluates whether its pulse arrived "early" or "late" in relation to its expected arrival time or position. For example, a series of PPM pulses can be transmitted at a rate of one per second. Because the receiver of PPM pulses expects pulses to arrive at a rate of one per second, a value can be assigned to the arriving pulse depending if it arrived 250 milliseconds (ms) early or 250 ms late.

For illustrative purposes, we will describe the pulse modulation as one of the preferred methods of modulation implemented in the present invention. The pulse modulation includes the use of pulse positioning characteristics provided in M-ary modulation schemes such as PPM. However, the pulse modulation focuses on evaluating "how late" a pulse arrives from its expected nominal position, versus PPM's method of simply evaluating whether a pulse has arrived early or late in relation to its expected nominal position. As an example, a 2-ary pulse modulation scheme based upon a 10 MHz pulse that is able to deliver two bits of information within the transmission of a single pulse. A 10 MHz pulse requires 100 nanoseconds in time to transmit. The modulation would define two time locations, with the first one as the nominal time or the expected time of the pulse. The second time location is 2.5 nanoseconds late, or after the nominal time. As a result, the total time required to transmit a single pulse is 102.5 ns. This yields a data throughput rate of approximately 9.75 Mbps.

To implement a 3-ary modulation scheme, simply add another time location of 2.5 ns after the second location, which is also 5 ns after the nominal position.

Combining methods of modulation can also be used transmit additional information. For example, if we continued using the 2-ary pulse modulation scheme described previously, in combination with phase modulation, we could transmit data an additional two values for a total of four different value combinations within the same amount of time.

In phase modulation, the transmitted 2-ary modulated pulse would be sent 0 or 180 degrees out of phase for an additional two more values within the same 102.5 ns of time.

The following chart describes the different values:

CHART 1

| 2-ARY PULSE MODULATION EXAMPLE | | |
| --- | --- | --- |
| 4-ary Value | Phase | Delay |
| "00" | 0 | 0 |
| "01" | 180 | 0 |
| "10" | 0 | 2.5 ns |
| "11" | 180 | 2.5 ns |

By increasing the potential value combinations, the data throughput yield has doubled from 9.75 Mbps in our 2-ary pulse modulated example to 19.5 Mbps in our 4-ary modulated example. As illustrated in the example above with 2-ary pulse modulation and phase modulation, there are other pulse modulation methods that can also be used in combination with each other that provide for a variety of performance levels.

PPM or pulse modulation methods as illustrated above provide for several unique advantages over traditional transmission methods in the demodulation process. PPM and pulse demodulation methods include the use of a correlator for the decoding and demodulation of a received PPM and pulse signal of the present invention.

The correlator method of matched filtering is implemented by cross-correlating the received pulse with a replica or model of the transmitted pulse shape, and then filtering the result. Received pulses that match the model of a transmitted pulse produce positive correlation results, while noise or interference signals do not. The decision about the presence or absence of a pulse can be made using a "maximum likelihood of detection" algorithm.

The receiver's synchronization hardware and software use a precise clock signal that marks the beginning of a time frame for each sequence of "n" pulses. This clock signal is derived from the correlator output of a matched filter dedicated to identifying the unique pulse shape, also called the sync pulse, associated with clock signal. The sync pulse is transmitted frequently enough, for example, one for every sequence of "n" pulses, to maintain timing synchronization. A delay-lock loop, or phase-lock loop are also methods that can be used to maintain good system synchronization between the transmitting and receiving devices.

The present invention's pulses are tolerant of interference because of their large processing gain. For example, a direct sequence spread spectrum system with a 10 MHz channel bandwidth to a 10 KHz information bandwidth yields a processing gain of 1000 times the information bandwidth, which is equal to 30 decibels (dB).

As the pulse repetition rates increase, a receiver may be prevented from integrating received pulse samples. In these cases a sub-carrier may be used to enhance interference mitigation and increase the capability to correlate a signal.

Figure 2A:
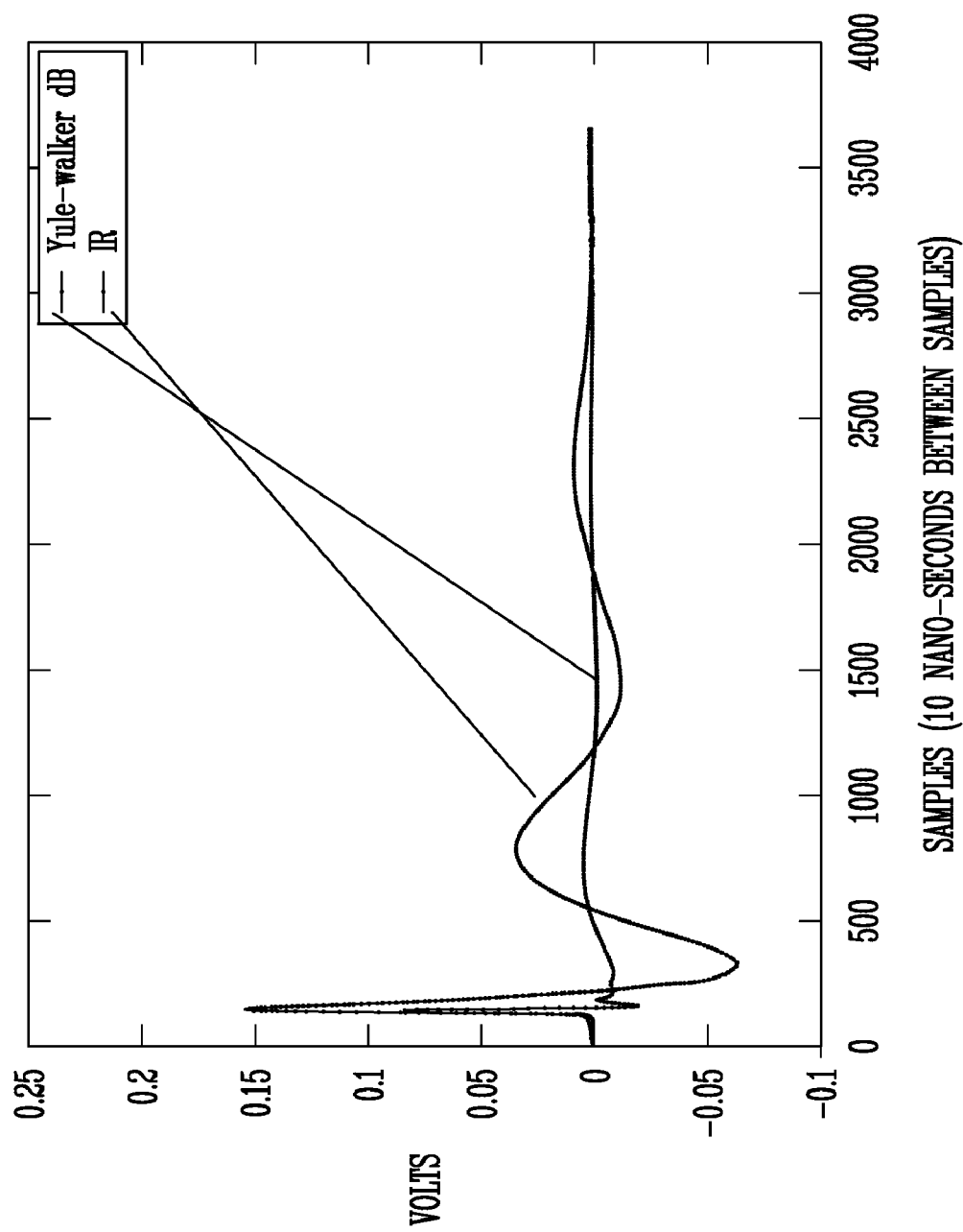
FIG. 2A is an illustration of a single impulse response, and the corresponding effect of equalization on a single impulse.

When ultra wideband pulses are modulated without using alternating counter pulses, which are pulses in which the polarity of each pulse is 180 degrees out of phase with respect to the previous pulse, the pulse train will begin to experience what is known as a DC offset. The DC offset has a cumulative effect which drives the signal out of a suitable dynamic range. In addition, when ultra wideband pulses are modulated without using alternating counter pulses, the channel becomes very long. FIG. 2A is an illustration of a single impulse and the effect of the present invention's equalizer on that single impulse. The effect of the present invention's equalizer combats the cumulative DC offset, so that the received signal can be decoded using a peak-detect methodology. An example of DC offset is shown in FIG. 2C.

Figure 2B:
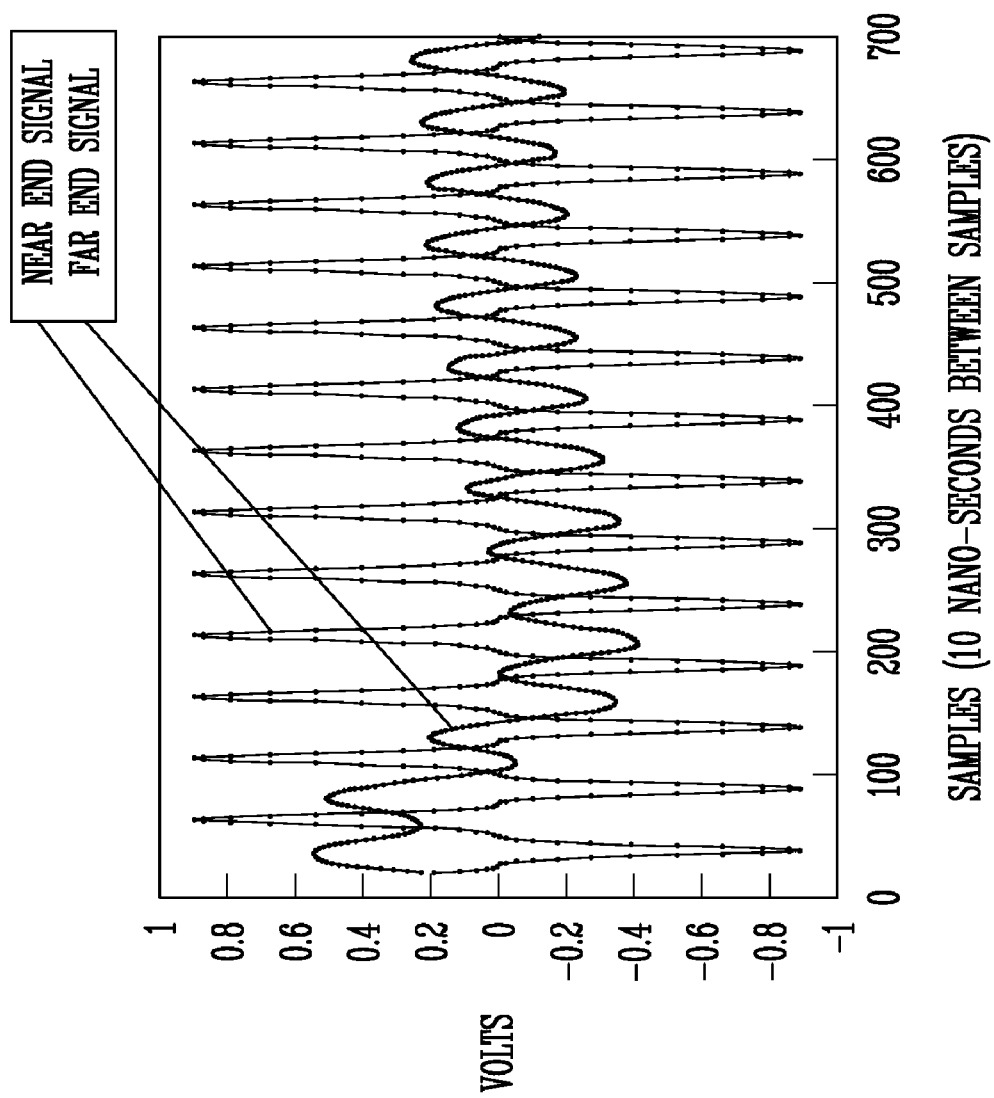
FIG. 2B is an illustration of the effect of alternating counter pulses which have been time modulated using a single pulse amplitude and sixteen pulse position offsets to represent data.

FIG. 2B is an illustration of the present invention's alternating counter pulse scheme in which each pulse is generated 180 degrees out of the phase with respect to the previous pulse. The signal is modulated to represent data using a single pulse amplitude and sixteen pulse position offsets. It is obvious to one skilled in the art that the pulse train's channel has been shortened dramatically. In addition, it is obvious to one skilled in the art that the received signal is very stable and the effect of DC offset has been successfully mitigated in order that the received signal can be easily decoded using a wide variety of methods.

Figure 2C:
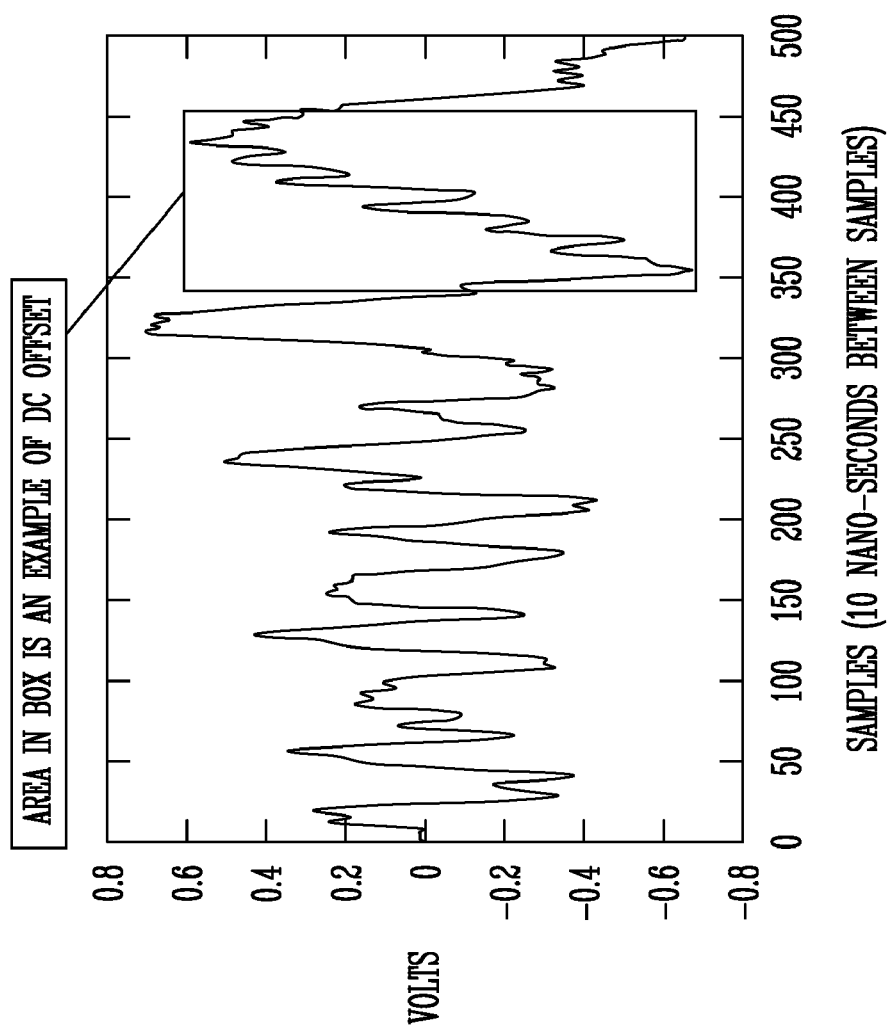
FIG. 2C is an illustration of the effect of alternating counter pulses which have been modulated using a 4 PPM/4 PAM scheme to represent data.

FIG. 2C is an illustration of the present invention's alternating counter pulse scheme in which the signal is being modulated using a 4 PPM/4 PAM scheme. The benefit of being able to modulate the signal using 4 pulse positions (PPM) and 4 pulse amplitudes (PAM) means the broadband system of the present invention has more bandwidth that when the signal is modulated using a single amplitude and 4 pulse positions to represent data. There is a DC offset in the received signal, but it has not driven the received signal out of a suitable dynamic range.

Exemplary Embodiments

The basis of the present invention is the specific, a priori knowledge of the transmission timing, and the existence and characteristics of a particular ultra wideband pulse. Whereas wave-oriented communications seek to extract the meaning of a wave, the present invention focuses simply on the existence of a pre-defined ultra wideband pulse, within a pre-defined window of time, on an electrically conducting wave guide such as a metallic medium. The key components of the broadband technology are the ultra wideband pulses, the modulation of the ultra wideband pulses in time, and/or amplitude and/or shape, and/or frequency, and/or phase, and the control of transmission power.

Recent advances in wireless communications technology have resulted in an emerging; revolutionary ultra wide band technology (UWB) called impulse radio communications systems (hereinafter called impulse radio). Although ultra wideband pulses are wideband in nature and similar to ones found in wireless UWB or impulse radio, the science of using them over long distances on a high attenuation and capacitance metallic mediums such as telephone twisted pair loops, coaxial cable, and power lines is significantly different.

To better understand the benefits of wireless impulse radio to the present invention, the following review of impulse radio follows and was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of wireless impulse radio patents includes U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998) to Fullerton et al. The aforementioned patents are hereby included in entirety by reference as they describe a number of circuits, filters, correlators, methods, techniques, etc., that are useful in the present invention.

It is often desirable when building wireless pulse radio receivers to include a sub-carrier with the baseband signal to help reduce the effects of amplifier drift and low frequency noise. The sub-carrier that is typically implemented alternately reverses modulation according to a known pattern at a rate faster than the data rate. This same pattern is then used to reverse the process and restore the original data pattern. These sub-carrier modulation methods are described in further detail in U.S. Pat. No. 5,677,927 to Fullerton et al, and may be useful in the present invention, and therefore, that patent is herein incorporated in entirety by reference.

The present invention may be configured to use a wide variety of network topologies. The following chart includes, but is not limited to, the following topologies which may be configured in loops, or point-to-point, or a combination.

CHART 2

NETWORK TOPOLOGY DEFINITIONS

SWITCHED ACCESS NETWORKS

| | |
|---|---|
| Telephone | Single Interface/User |
| Telephone | Multiple Interfaces/User |

SHARED ACCESS NETWORKS

| | |
|---|---|
| Cable TV | Single Interface/User |
| Cable TV | Multiple Interfaces/User |
| Community Access Television Network | Single Interface/User |
| Community Access Television Network | Multiple Interface/User |
| Power Line | Single Interface/User |
| Power Line | Multiple Interfaces/User |
| LAN | Single Interfaces/User |
| LAN | Multiple Interfaces/User |
| BUS | Single Interface/User |
| BUS | Multiple Interfaces/User |

HYBRID NETWORKS

| | |
|---|---|
| Any Combination of Telephone, Cable TV, Power Line, Wireless, LAN, PAN, BUS | Single Interface/User |
| Any Combination of Telephone, Cable TV, Power Line, Wireless, LAN, PAN, BUS | Multiple Interfaces/User |

The present invention's network topologies may be configured to use a wide variety of mediums for transporting data. The following chart includes, but is not limited to, the following mediums:

CHART 3

TRANSPORT MEDIUMS

GUIDED MEDIUMS

Un-bonded Telephone Twisted Pairs (TTP)
Bonded Telephone Twisted Pairs (TTP)

CHART 3-continued

TRANSPORT MEDIUMS

Coaxial Cables
CAT-5 Wiring
Power Lines (Long Distance Power Distribution)
Power Lines (In-Building)
Metallic Pipes
Railroad Rails
Drill Stem
Highway Rebar
Vehicle Frames & Bodies (Including Cars, Trucks, Tanks, Airplanes, Tanks, Cranes, Etc.)
Missile & Rocket Bodies
Metal Desks
Desks & Benches With Metallic Bus Strips (Including Wooden Desks, Kitchen Counters,
Lab Benches, Etc.)
Compute Device Backplanes
Ultra Wideband Pulses on Narrow Band Sine-Wave Carriers Operating Over Guided Mediums The present invention's network topologies may be configured to use a wide variety of directions and methods for transporting data. The following chart includes, but is not limited to, the following common methods:

CHART 4

TRANSPORT DIRECTIONS, METHODS

TRANSMISSION DIRECTIONS

Simplex - One direction only.
Half-Duplex - Bi-directional, one direction at a time.
Full-Duplex - Bi-directional, both directions at the same time. The upstream and downstream directions may be symmetrical, or asymmetrical in bandwidth.

METHODS FOR ACCOMMODATING MULTIPLE USERS/DEVICES

Figure 3:
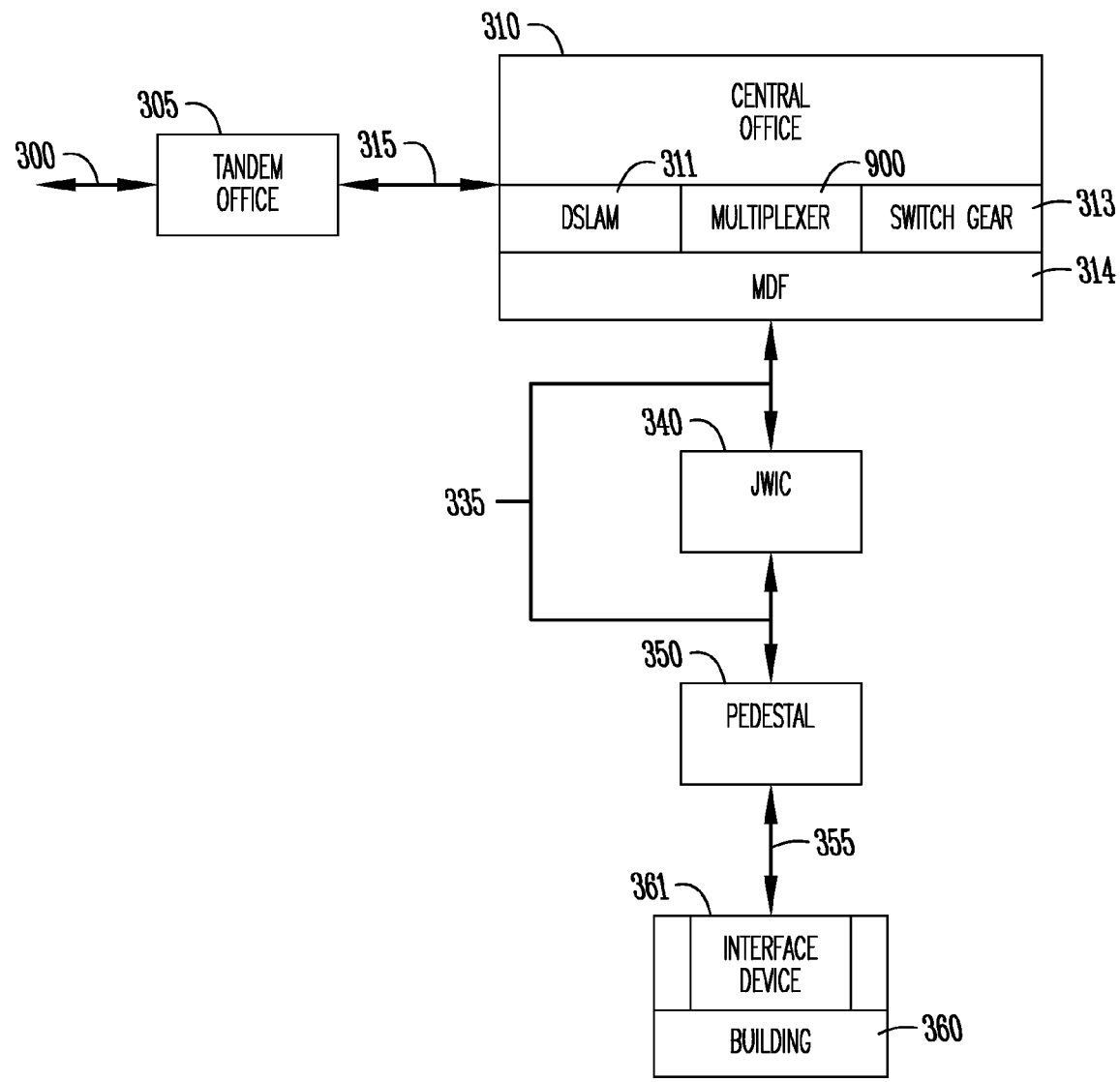
FIG. 3 is a block diagram of a PSTN network topology configured in accordance with the preferred embodiment of the present invention.
Figure 4:
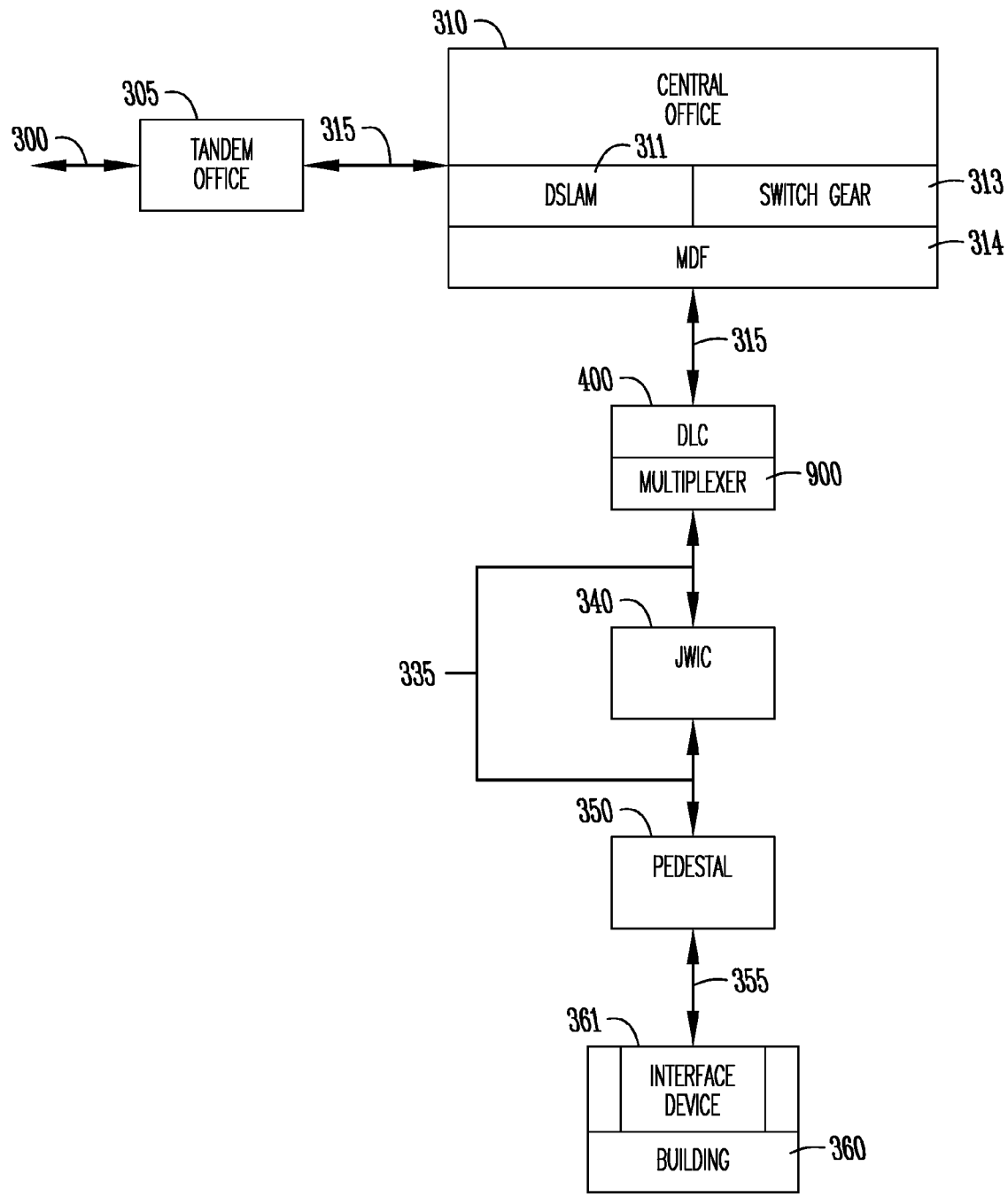
FIG. 4 is an illustration of a PSTN network topology with intermediate field electronics configured in accordance with an alternate embodiment of the present invention.

Synchronous Time Division Multiplexed
Asynchronous Time Division Multiplexed
Code Division Multiplexed
Frequency Division Multiplexed
Orthogonal Frequency Division Multiplexed Specific Topologies "Last Mile" Access Network Topologies—FIG. 3 illustrates the preferred embodiment of the present invention is configured as a Public Switched Telephone Network (PSTN) topology without any intermediate field electronics, such as a Digital Loop Carrier (DLC) 400 as shown in FIG. 4. The present invention deployed on a PSTN may operate a single private multiplexed downstream and upstream of ultra wideband pulses, or a plurality of private downstreams and upstreams of ultra wideband pulses. In addition, these pulses may be alternating counter pulses.

The PSTN is a circuit switched network, which is normally accessed by telephones, key telephone systems, private branch exchange trunks, and data arrangements. The circuit between the call originator and call receiver in a PSTN is completed using network signaling in the form of dial pulses or multi-frequency tones. Even though long distance carriers generally operate fiber optic networks, the Local Exchange Carriers (LEC) and Competitive Local Exchange Carriers (CLEC) are the primary "last mile" link, which is generally telephone twisted pair, to the home, or business.

Figure 9:
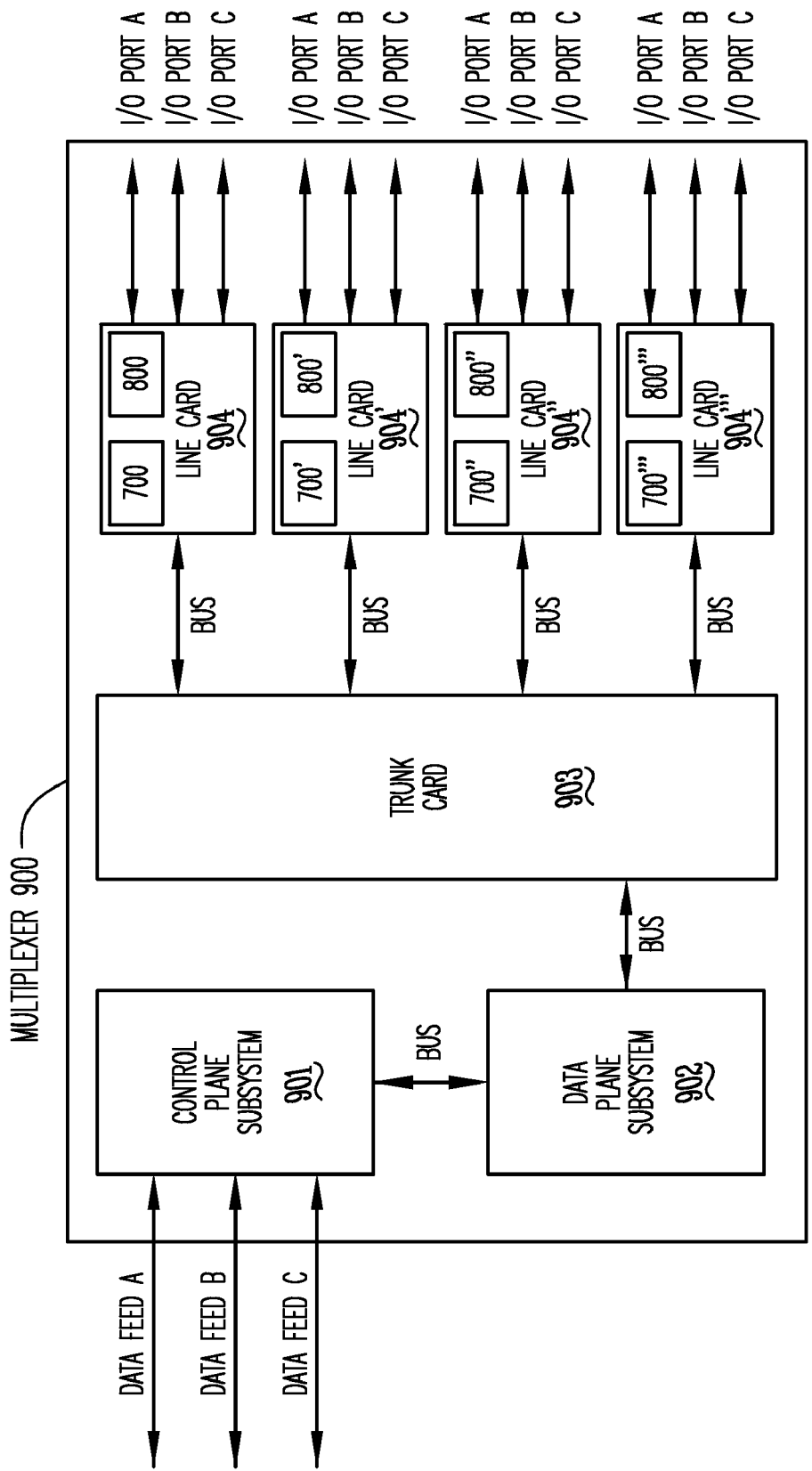
FIG. 9 is a block diagram of a multiplexer according to one embodiment of the present invention.

The preferred embodiment of the present invention as shown in FIG. 3 is a typical LEC PSTN network topology configured without any intermediate field electronics, and with the addition of a multiplexer 900, which may also be referred to as a UWB unit or telecommunications interface and is shown in FIG. 9. The tandem office 305 is the toll administration office that connects the LEC, via transmission medium 300, which may be fiber optic cable, a wireless system, etc., to other LECs through long distance Interchange Carriers (IXC), Internet Service Providers (ISP), Application Service Providers (ASP), to peering points, such as, but not limited to another computer, a server farm, and data reverberating over a network. The tandem office 305 is connected to one or more Central Offices (CO) 310 via the underground plant 315. The underground plant 315 usually consists of transport medium, such as, but not limited to, fiber optic lines for the transport of multiplexed, digital data streams.

CO 310 is the switching center for the LEC. The CO 310 is the co-location point for any DSL equipment the LEC is operating, such as, but not limited to a Digital Subscriber Lines Access Multiplexer (DSLAM), etc. The DSLAM 311 generates, modulates, transmits, and receives DSL signals to and from the Main Distribution Frame (MDF) 314. The CO 310 also houses the switching gear 313 for completing circuits between two, or more customers, and the MDF 314, which is the main termination block for all of a LEC's telephone twisted pairs. The CO 310, will also be the co-location point for the present invention's multiplexer 900. This equipment generates, modulates, transmits, and receives signals to and from the MDF 314. The ultra wideband pulses may be non-convolved or convolved prior to transmission. The present invention may be configured on a blade in order to co-exist in a DSLAM cabinet which may be operating DSL blades.

MDF 314 is connected to the end-user via feeder distribution network 335, which are telephone twisted pairs grouped together in binders of 25 or 50, Junctor Wire Interface Cabinets (JWIC) 340, and pedestal(s) 350. JWIC 340 is a mechanical cross-connect cabinet that connects the telephone twisted pairs coming from MDF 314 to the various pedestals 350, via feeder distribution network 335 in a LEC's network. The telephone twisted pairs the comprise the network may be un-bonded or bonded pairs.

Pedestal 350 is a junction box where customer drops 355 are terminated in a neighborhood. Customer drops 355 are telephone twisted pairs from the pedestal 350 to the interface device 361, which can be located inside, or outside a customer's building 360. Interface device 361 can be equipment, such as, but not limited to, a codec 1000 shown in FIG. 10.

The LEC described in FIG. 3 may continue to operate normal voice, media, and data services over their network. The ultra wideband signals can co-exist on the same TTP in the same frequency range of other narrow band or wideband signals, or in notched frequency ranges separate from other narrow band or wideband signals. Local voice traffic may continue to be switched, and packets of media and data may be handled with existing, or future systems and protocols such as, but not limited to, Integrated Services Digital Network (ISDN), DSL, Asynchronous Transfer Mode (ATM), analog codec, Transmission Control Protocol/Internet Protocol (TCP/IP), etc. The present invention provides a protocol and system agnostic carrier that can be enabled to carry any form of digital voice, media, and data transmissions, such as, but not limited to, TCP/IP packets, ATM frames, etc. The multiplexer 900 in the CO 310 will generate ultra wideband pulse transmissions at, or below the noise level, of the LEC's network.

Once inside building 360, high data rate Home PNA-type systems can be built using ultra wideband pulses transmitted over telephone twisted pairs or electrical wiring.

In order to achieve longer transmission distances at lower data rates from the CO 310, over-sampling techniques such as, Cyclic Redundancy Code (CRC), and Forward Error Correction (FEC), etc., can be used to insure an acceptable Bit Error Rate (BER).

FIG. 4 illustrates an alternate embodiment of the present invention is configured as a Public Switched Telephone Network (PSTN) topology which includes intermediate field electronics in the form a Digital Loop Carrier (DLC) cabinet 400. This network topology of the present invention may operate a single private multiplexed downstream and upstream of ultra wideband pulses, or a plurality of private downstreams and upstreams of ultra wideband pulses. The ultra wideband pulses are high number base encoded, and are near, or in the noise range of the transmission on a network, which may be running voice, video, and data traffic by means other than the ultra wideband pulses of the present invention. In addition, these ultra wideband pulses may be alternating counter pulses. The telephone twisted pairs (TTP) that comprise the network may be un-bonded or bonded pairs.

Bonded pair TTPs are balanced, insulated conductors that are mirror images of each other. The balance is achieved by maintaining a consistent and controlled center-to-center distance between the conductors in the pair, which helps to ensure that the signal does not radiate from one conductor to the other and cause damaging cancellation effects.

The PSTN is a circuit switched network, which is normally accessed by telephones, key telephone systems, private branch exchange trunks, and data arrangements. The circuit between the call originator and call receiver in a PSTN is completed using network signaling in the form of dial ultra wideband pulses or multi-frequency tones. Even though long distance carriers generally operate fiber optic networks, the Local Exchange Carriers (LEC) and Competitive Local Exchange Carriers (CLEC) are the primary "last mile" link, which is generally telephone twisted pair networks, to the home, or business.

This alternate embodiment of the present invention is a typical LEC, as shown in FIG. 4, with the addition of a multiplexer 900. The tandem office 305 is the toll administration office that connects the LEC, via transmission medium 300, which may be fiber optic cable, a wireless system, etc., to other LECs through long distance Interchange Carriers (IXC), Internet Service Providers (ISP), Application Service Providers (ASP), to peering points, such as, but not limited to another computer, a server farm, and data reverberating over a network. The tandem office 305 is connected to one or more Central Offices (CO) 310 via the underground plant 315. The underground plant 315 usually consists of transport medium, such as, but not limited to, fiber optic lines for the transport of multiplexed, digital data streams.

CO 310 is the switching center for the LEC. The CO 310 is a co-location point for any DSL equipment the LEC is operating, such as, but not limited to a Digital Subscriber Lines Access Multiplexer (DSLAM), etc. The DSLAM 311 generates, modulates, transmits, and receives DSL signals to and from the Main Distribution Frame (MDF) 314. CO 310 also houses the switching gear 313 for completing circuits between two, or more customers, and the MDF 314, which is the main termination block for all of a LEC's telephone twisted pairs. This equipment generates, modulates, transmits, and receives ultra wideband pulse signals to and from the MDF 314. The pulses may be non-convolved, or convolved prior to transmission.

The MDF 314 sends and receives multiplexed, digital data streams to and from the DLC 400 via the underground plant 315. The Digital Loop Carrier (DLC) 400 are connected to an end-user via feeder distribution network 335, which are telephone twisted pairs grouped together in binders of 25 or 50, Junctor Wire Interface Cabinets (JWIC) 340, and pedestal(s) 350. DLC 400 is a piece of intermediate field electronics used to increase the physical reach of a CO. DLC 400 is an analog to digital converter, and multiplexer for traffic coming from a customer's building 360 back to the CO 310. In this embodiment of the present invention, the DLC 400, serves as the co-location point for the present invention's multiplexer 900. JWIC 340 is a mechanical cross-connect cabinet that connects the telephone twisted pairs coming from DLC 400 to the various pedestals 350, via feeder distribution network 335 in a LEC's network.

Pedestal 350 is a junction box where customer drops 355 are terminated in a neighborhood. Customer drops 355 are telephone twisted pairs from the pedestal 350 to the interface device 361, which can be located inside, or outside a customer's building 360. Interface device 361 can be equipment, such as, but not limited to, a codec 1000 shown in FIG. 10.

The LEC described in FIG. 4 may continue to operate normal voice, media, and data services over their network. The ultra wideband signals can co-exist on the same TTP in the same frequency range of other narrow band or wideband signals, or in notched frequency ranges separate from other narrow band or wideband signals. Local voice traffic may continue to be switched, and packets of media and data may be handled with existing, or future systems and protocols such as, but not limited to, Integrated Services Digital Network (ISDN), DSL, Asynchronous Transfer Mode (ATM), analog codec, Transmission Control Protocol/Internet Protocol (TCP/IP), etc. Protocol and system agnostic carrier of the present invention can be enabled to carry any form of digital voice, media, and data transmissions, such as, but not limited to, TCP/IP packets, ATM frames, etc. The multiplexer 900 in the DLC 400 will generate transmissions at, or below the noise level, of the LEC's network.

Once inside building 360, high data rate Home PNA-type systems can be built using ultra wideband pulses transmitted over telephone twisted pairs or electrical wiring.

In order to achieve longer transmission distances as lower data rates from the DLC 400, over-sampling techniques such as, Cyclic Redundancy Code (CRC), and Forward Error Correction (FEC), etc., can be used to insure an acceptable Bit Error Rate (BER).

Figure 10:
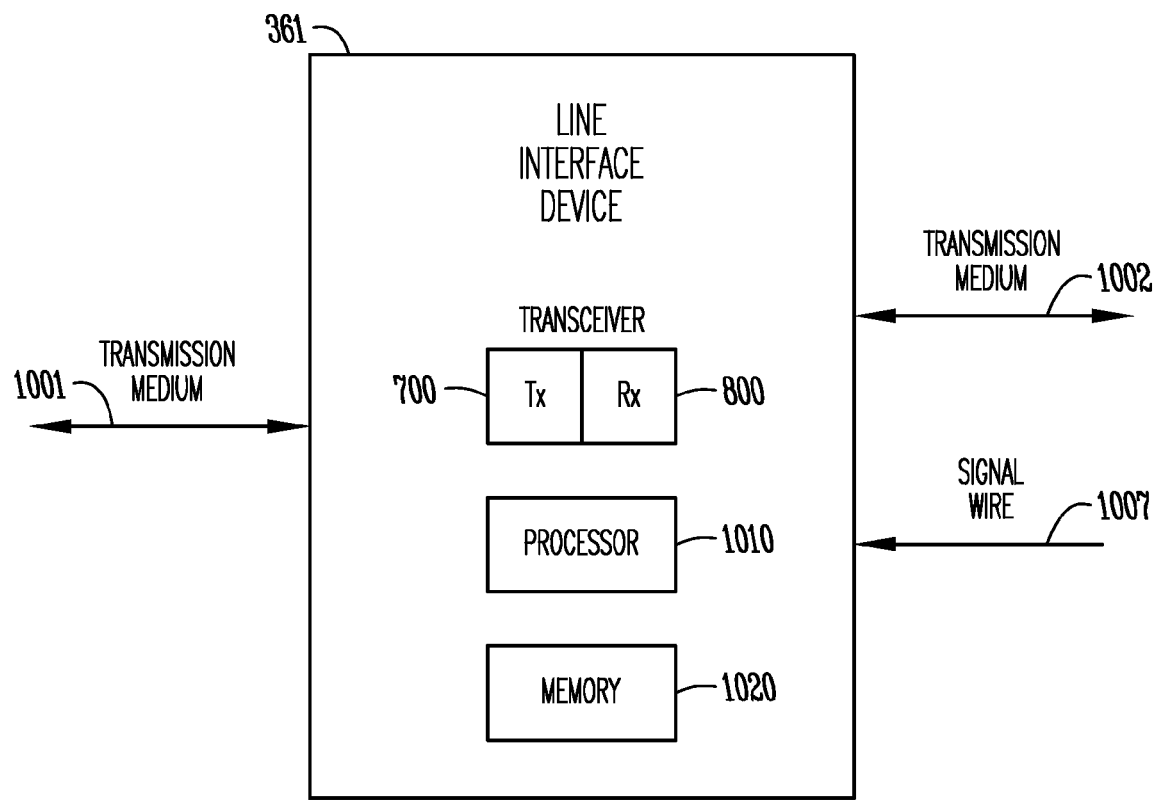
FIG. 10 is a block diagram of a codec according to one embodiment of the present invention.

The following is an example of retrieving an Internet web page using the preferred embodiment of the present invention as shown in FIG. 3, or the alternate embodiment of the present invention as shown in FIG. 4. A user with service over their LEC's switched network wishes to use their PC to access a web page from a remote server. The client device, such as, but not limited to a PC, is connected, either internally or externally to a stand-alone codec 1000, as shown in FIG. 10, or integrated into a device. Codec 1000 is shown in FIG. 10, and in one embodiment can be a UWB modem.

The PC uses Internet browser software, such as, but not limited to Microsoft Internet Explorer 6.0, in order to initiate the following steps that would generally be required to connect to the remote server using a standard client-server architecture, using a codec 1000, as shown in FIG. 10, for access to the Internet over a LEC's switched network, through an Internet Service Provider (ISP) in order to retrieve the following file: http://www.dlblimited.com/aboutDLB.htm The browser breaks the Uniform Resource Locator (URL) into 3 parts:
　　The communication protocol to be used: Hyper Text Transfer Protocol (HTTP)
　　The server name to be accessed: (www.dlblimited.com)
　　The requested file: (aboutDLB.htm)

The PC's communication software creates a data packet using TCP/IP stack protocol The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.

The PC sends the TCP/IP data packet encapsulated in PPP to a codec 1000, as shown in FIG. 10, which is a full-duplex device, in order to transmit and receive digital information over twisted telephone pairs.

The PC can be transmit TCP/IP data packets over a plurality of methods to the codec 1000, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The codec 1000, as shown in FIG. 10 may be stand alone or integrated into another device.

The codec 1000, as shown in FIG. 10, converts the byte information contained in the data packet into time delays for ultra wideband pulses, modulates the ultra wideband pulses in a manner that is compatible with the LEC's telephone twisted pair, and serially transmits signal ultra wideband pulses over the LEC's switched network as a PN coded noise-like signals.

The CO 310 or DLC 400 houses a multiplexer 900 that converts the PN coded noise-like signals containing data resulting from typical Internet usage back into bytes, the bytes into individual bits, then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.

The process is reversed at the LEC's central office when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The CO's 310 or DLC's 400 multiplexer 900 converts the data packet bytes into time delays for ultra wideband pulses, and serially transmits signal ultra wideband pulses over the LEC's switched network as pseudo-random coded noise to the original web page requester.

The requester's codec detects the received signal using as an example, but not limited to, peak detection, or a decision feedback equalizer using symbol recognition, demodulates the ultra wideband pulses, converts ultra wideband pulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

Figure 5:
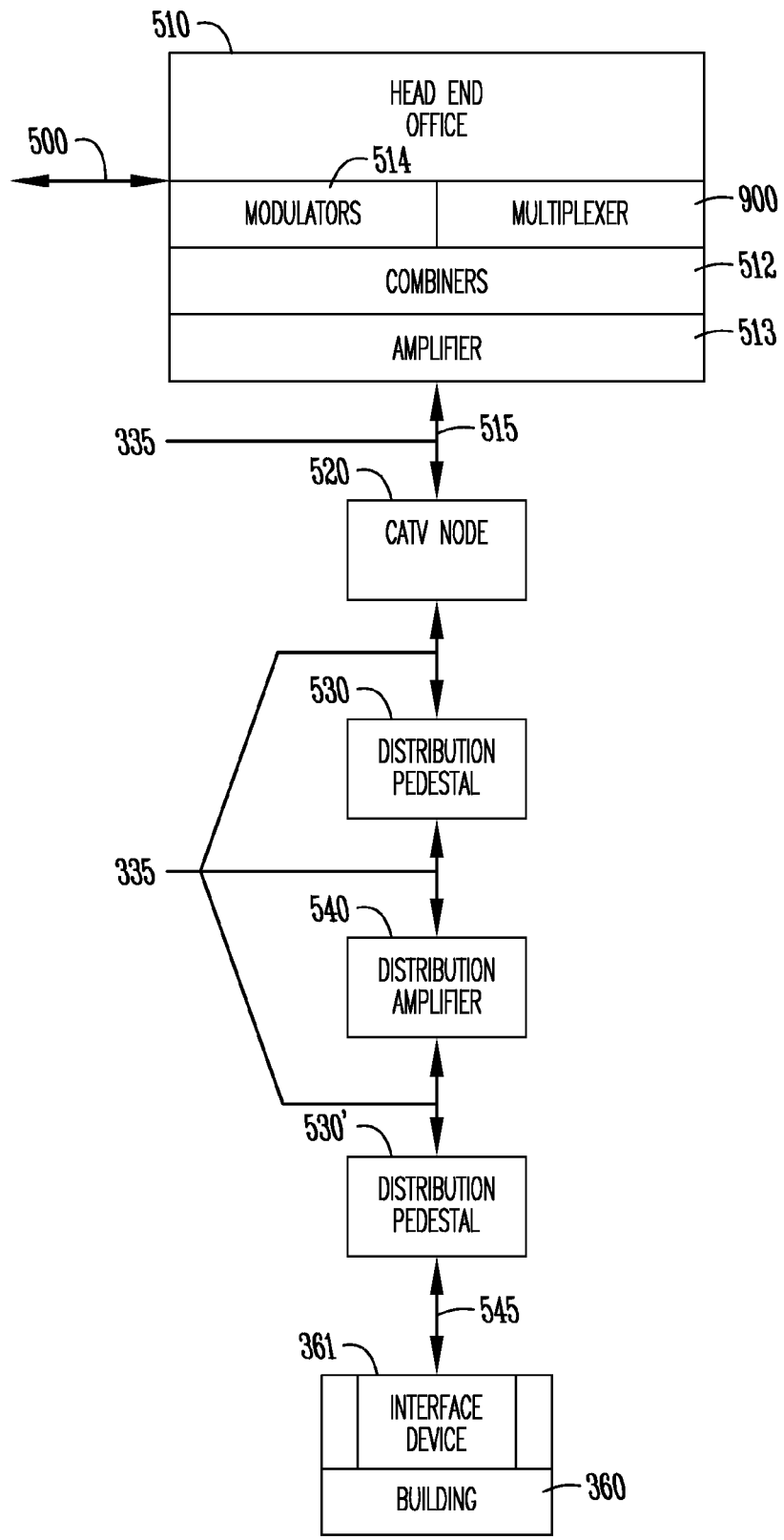
FIG. 5 is an illustration of a CATV network topology configured in accordance with an alternate embodiment of the present invention.

FIG. 5 illustrates an alternate embodiment of the present invention, and is a Cable Television network (CATV), which may operate a single, or a plurality of shared multiplexed downstreams and upstreams of ultra wideband pulses. The ultra wideband signals can co-exist on the same TTP in the same frequency range of other narrow band or wideband signals, or in notched frequency ranges separate from other narrow band or wideband signals. The CATV network may be operating narrow band voice, video, and data traffic by means other than the ultra wideband pulse transmissions of the present invention. In addition, these pulses may be alternating counter pulses.

Cable television networks are generally categorized by their overall bandwidth, which equates to the total number of channels they can transmit. Older systems are designated as 330 MHz and 550 MHz. Newer systems are designated as 750 MHz, 860 MHz, and 1 GHz. CATV networks use coaxial, and/or fiber optic cable to distribute video, audio, and data signals to homes or other establishments that subscribe to the service. Systems with bi-directional capability can also transmit signals from various points within the cable network to a central originating point.

CATV distribution systems typically use leased space on utility poles owned by a telephone or power distribution company. In areas with underground utilities, CATV systems are normally installed either in conduits, or buried directly, depending on local building codes and soil conditions.

An alternate embodiment of the present invention is a typical CATV all-coax network, as shown in FIG. 5, with the addition of a multiplexer 900. The Head End Office 510 is the central originating point of all signals carried throughout the CATV network that connects the CATV network to programming via transmission medium 400, which may be fiber optic cable, and/or a wireless system, such as, but not limited to satellites, and/or media servers, etc. Transmission medium 400 may also be used to connect to data sources for cable codec customers through an Internet Service Provider (ISP), Application Service Provider (ASP), to peering points, such as, but not limited to another computer, a server farm, and data reverberating.

Head End Office 510 is the multiplexing and switching center for the CATV network. The Head End Office 510 can also be a co-location point for an ISP. The Head End Office 510 houses modulators 514 to receive input baseband signals from transmission medium 500, and generate a high-quality vestigial sideband TV signal for output to a combiner 512. Combiners 512 are used to combine several signals into a single output with a high degree of isolation between inputs. The Head End Office 510, will also be the co-location point for the present invention's multiplexer 900. This equipment generates, modulates, transmits, and receives data signals from a customer, switched networks, such as but not limited to the PSTN, and data packet networks, such as, but not limited to the Internet. The signals from the combiners 512 are fed to an amplifier 513 that is a low noise, high gain amplifier that also stabilizes the level of VHF and UHF channel output signals.

The amplifier 513 sends and receives multiplexed, analog and/or digital data streams to and from the distribution network. CATV networks are specialized systems for transmitting numerous television channels in a sealed spectrum, rather than a general-purpose communications medium, so the topology of the network is designed for maximum distribution efficiency, and is called a tree-and-branch architecture. Signals from the Head End Office 510 are routed over transmission medium 515, which is coaxial cable to CATV node 520. CATV node 520 is a main distribution point in a CATV network to the various branches that serve smaller geographical areas. The CATV node 520 relays signals via a serial distribution system of distribution pedestals 530, 530', distribution amplifiers 540, to a customer's drop 545, via feeder distribution network 535. The present invention is also applicable to CATV networks configured in a ring topology.

The customer's drop 545 is connected to a interface device 361, which can be equipment, such as, but not limited to, a CATV splitter, from which coaxial cable in building 360 may terminate directly into the television receiver on 12-channel systems, or into a converter where more than 12 channels are provided. Most modern receivers and videocassette recorders are "cable-ready" and include the necessary converters to access the additional system channels. Systems providing pay services may require a descrambler, or other form of converter, in the subscriber's home to allow the viewer to receive these special services. Newer cable systems use addressable converters or descramblers, giving the cable operator control over the channels received by subscribers. This control enables services such as per-view pay without the need for a technician to visit the home, or business, to install the special service. In addition, the customer drop 445 may terminate at an interface device 361 with an integrated codec 1000, as shown in FIG. 10.

The CATV network described in FIG. 5 will continue to provide their normal media and data services over their network. In addition, the multiplexer 900 in the Head End Office 510 will generate ultra wideband transmissions over the CATV network operating near, or in the noise level in order to create additional channels for greater bandwidth. The ultra wideband pulses may be non-convolved, or convolved prior to transmission.

In addition, once inside building 360, high data rate Home PNA-type systems can be built using the ultra wideband pulse transmissions of the present invention over telephone twisted pairs or electrical wiring The following is an example of retrieving an Internet web page using the CATV embodiment of the present invention as shown in FIG. 5. A user with the service of the present invention over their CATV provider's network wishes to use their PC to access a web page from a remote server. The client device, such as, but not limited to a PC, is connected, either internally or externally to a stand-alone codec 1000, as shown in FIG. 10, or integrated into a device.

The PC uses Internet browser software, such as, but not limited to Microsoft Internet Explorer 6.0, in order to initiate the following steps that would generally be required to connect to the remote server using a standard client-server architecture, using a codec 1000, as shown in FIG. 10, for access to the Internet over a CATV network, through an Internet Service Provider (ISP) in order to retrieve the following file: http://www.dlblimited.com/aboutDLB.htm The browser breaks the Uniform Resource Locator (URL) into 3 parts:

The communication protocol to be used: Hyper Text Transfer Protocol (HTTP)

The server name to be accessed: (www.dlblimited.com)

The requested file: (aboutDLB.htm)

The PC's communication software creates a data packet using TCP/IP stack protocol The PC's communication software encapsulates the TCP/IP data packet in Point-to-Point Protocol (PPP), which is an established standard for the assignment and management of IP addresses, asynchronous (start/stop) and bit-oriented synchronous encapsulation, network protocol multiplexing, link configuration, link quality testing, error detection, and option negotiation for such capabilities as network layer address negotiation and data-compression negotiation.

The PC sends the TCP/IP data packet encapsulated in PPP to a codec 1000, as shown in FIG. 10, which is a full-duplex device, in order to transmit and receive digital information over twisted telephone pairs.

The PC can transmit TCP/IP data packets over a plurality of methods to the codec 1000, as shown in FIG. 10, including but not limited to local and external buses such as Peripheral Component Interconnect (PCI), Advanced TCA, Industry Standard Architecture (ISA), Ethernet, Infiniband, Universal Serial Bus (USB), serial or parallel, 802.11 wireless, Bluetooth, etc. The codec 1000, as shown in FIG. 10 may be stand alone or integrated into another device.

The codec 1000, as shown in FIG. 10, converts the byte information contained in the data packet into time delays for ultra wideband pulses, modulates the ultra wideband pulses in a manner that is compatible with the CATV provider's coaxial cable, and serially transmits signal ultra wideband pulses over the CATV provider's network as a PN coded noise-like signals.

The Head End office 510 houses a multiplexer 900 that converts the PN coded noise-like signals containing data resulting from typical Internet usage back into bytes, the bytes into individual bits, then modulates and signals the bits onto the packet network for routing to a user's ISP. Typical Internet usage data includes, but is not limited to domain name resolutions on Domain Name Servers (DNS), transmission of browser cookies, transmission of client environment information like browser-type and version, HTTP requests such as "get and post" operations, FTP requests, Telnet requests, Post-Office Protocol (POP3) E-mail requests, etc.

The process is reversed at the CATV Head End office 510 when requests such as HTTP, FTP, Telnet, POP3 are fulfilled and responded with data packet(s) containing the requested information in a variety of formats including, but not limited to files, streams, Hyper Text Markup Language (HTML), Graphics Interchange Format (GIF), Joint Photographic Experts Group (JPEG), American Standard Code for Information Interchange (ASCII), Tag Image File Format (TIFF), Portable Document Format (PDF), Motion Pictures Expert Group (MPEG), MPEG 1 Audio Layer 3 (MP3), binary, etc.

The Head End office's 510 multiplexer 900 converts the data packet bytes into time delays for ultra wideband pulses, and serially transmits signal ultra wideband pulses over the CATV provider's network as pseudo-random coded noise to the original web page requester.

The requester's codec receives the ultra wideband signal using as an example, but not limited to, peak detection, or a decision feedback equalizer using symbol recognition, demodulates the ultra wideband pulses, converts ultra wideband pulses to bytes and subsequently bits, to be forwarded to the PC by modulating them over the network or bus as described above.

The PC's browser processes the HTML tags and formats the web page for display on the PC's monitor. The PC browser may invoke a plurality of "plugins" to provide additional functionality and to display data formats other than HTML. For example, Adobe Acrobat to display PDF files or Windows Media Player for MPEG and MP3 files and streams.

This entire process may be repeated several times in order to retrieve a single web page, or transmit other types of digital data at high speeds, such as, but not limited to, voice, music, video, software, communicate with an Application Service Provider (ASP), video conferencing, etc.

Figure 6:
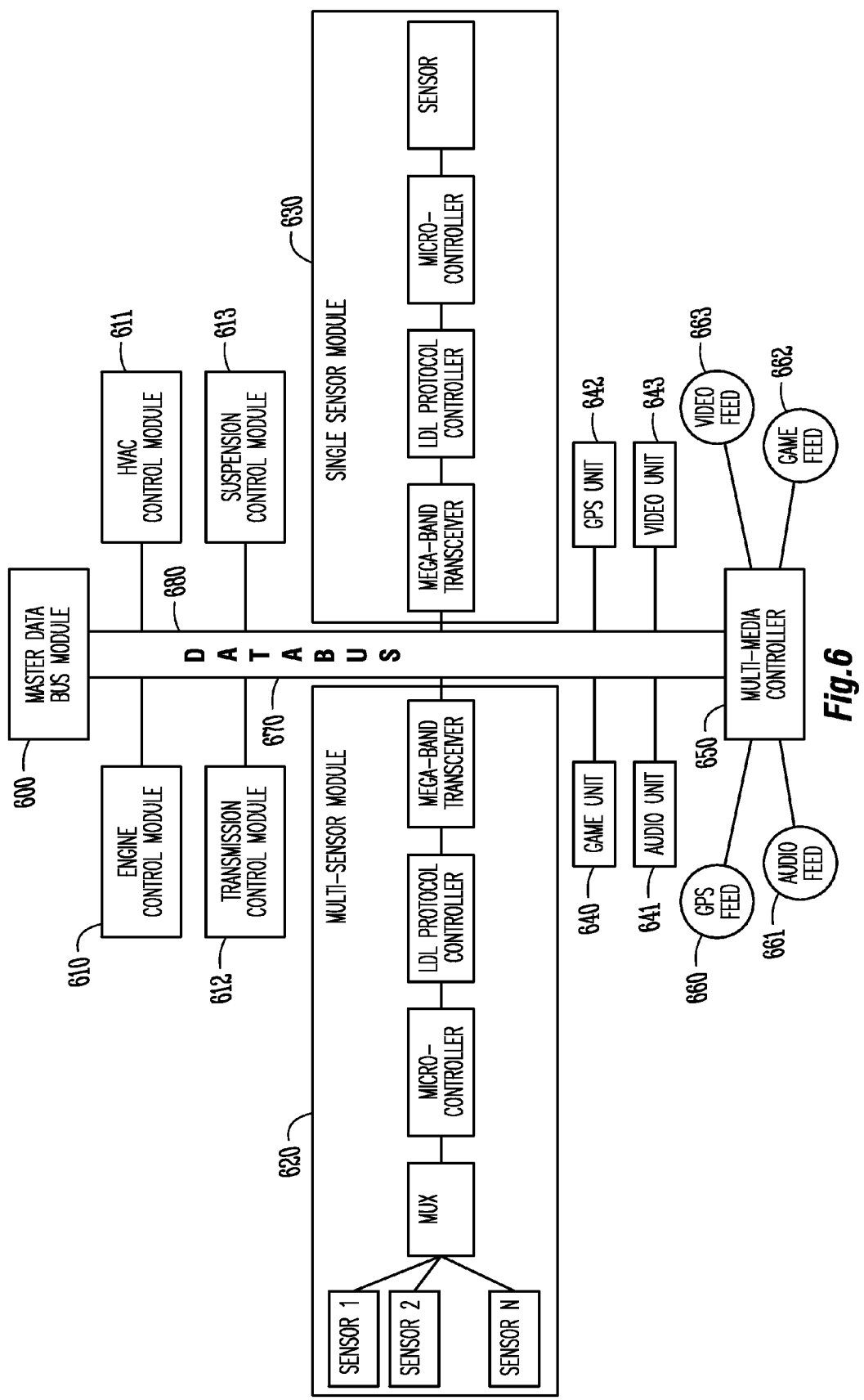
FIG. 6 is a block diagram of a data bus network topology configured in accordance with an alternate embodiment of the present invention.

FIG. 6 illustrates an embodiment of the present invention used as high speed data bus for use in an automobile for example. The inventors have tested the transmission and reception of the present invention's ultra wideband pulsed signals over the metallic portions of a pick-up truck.

The data bus network may operate a single, or a plurality of shared multiplexed downstreams and upstreams of present invention's ultra wideband pulses. The ultra wideband signals can co-exist on the same TTP in the same frequency range of other narrow band or wideband signals, or in notched frequency ranges separate from other narrow band or wideband signals. The data bus network may be running voice, video, and data traffic by means other than the present invention. In addition, these pulses may be alternating counter pulses. The ultra wideband pulses may be transmitted non-convolved, or convolved. The received pulses may be captured using as an example, but not limited to, peak detection, or a decision feedback equalizer using symbol recognition.

The data bus network as illustrated in FIG. 6 is comprised of various components connected to data bus 670, which is a guided media. These components include a master data bus module 600 which control various electronic control modules which are well known in the art, including, but not limited to, engine control module 610, HVAC control module 611, transmission control module 612, and suspension control module 613. In addition, master data bus module 600 controls various sensors connected to the data bus network via data bus 670, including a multi-sensor module 620, and a single sensor module 630 connected to the data bus network. Only one of each type of sensor module is shown for clarity, but in reality there can be as many as 50 sensors on a current model year vehicle. Also connected to the data bus network is a multi-media controller 650 which manages various feeds including, but not limited to a GPS feed 660, audio feed 661, game feed 662, and video feed 663, which are distributed to a game unit 640, audio unit 641, GPS unit 642, and a video unit 643 via the data bus 670.

Figure 7:
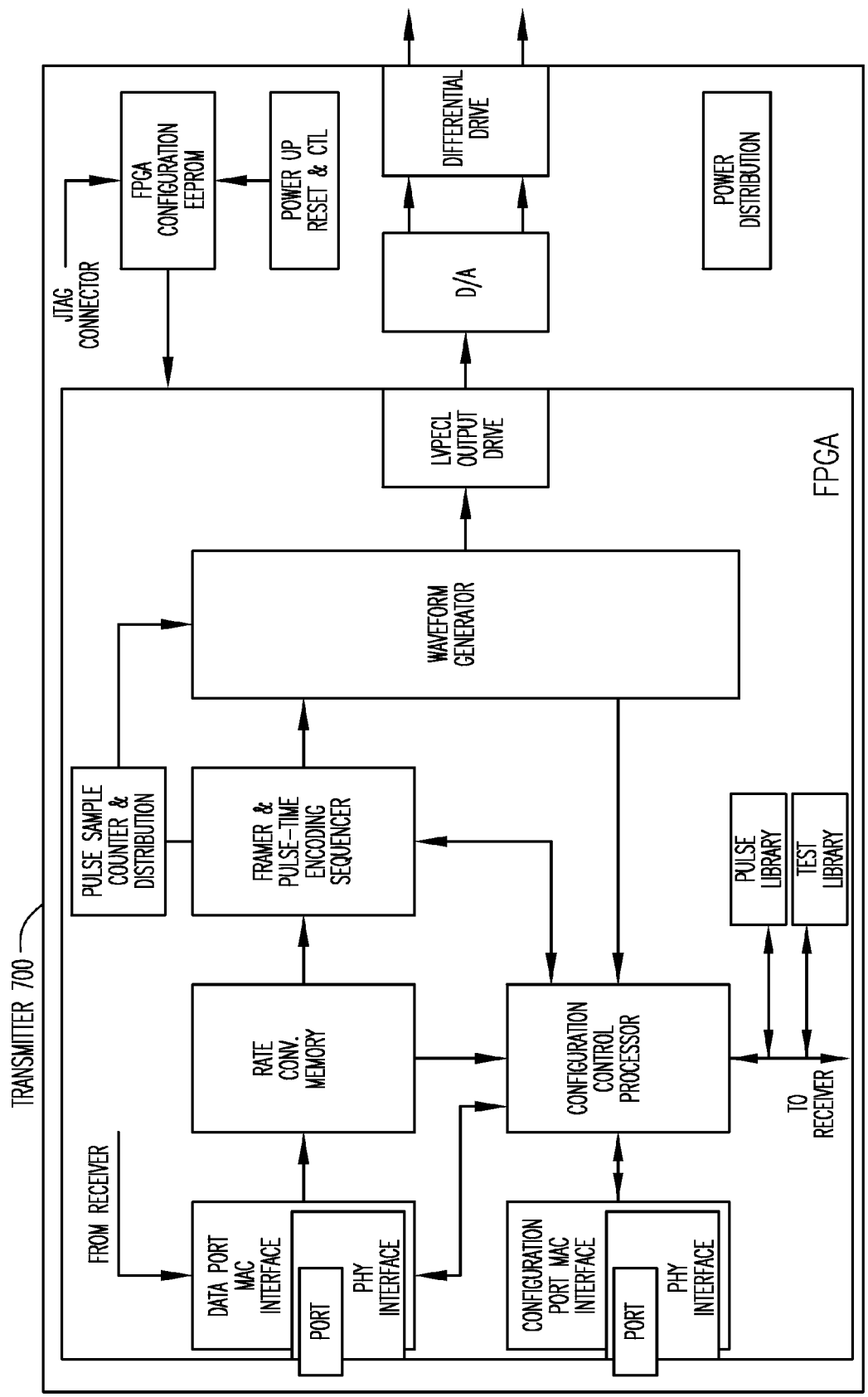
FIG. 7 is a block diagram of a transmitter according to one embodiment of the present invention.
Figure 8:
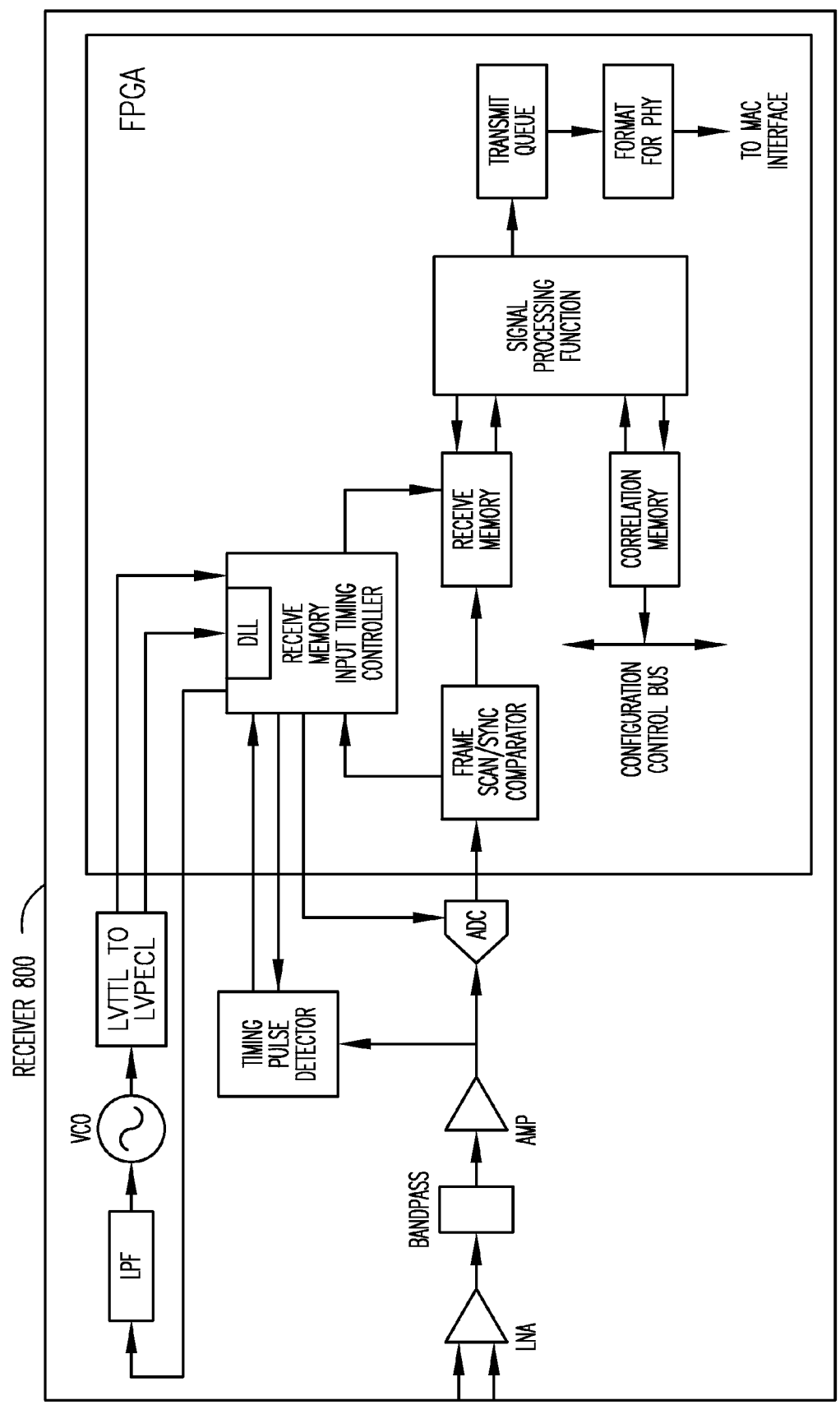
FIG. 8 is a block diagram of a receiver according to one embodiment of the present invention.

The master data bus module 600, engine control module 610, HVAC control module 611, transmission control module 612, suspension control module 613, multi-sensor module 620, single sensor module 630, game unit 640, audio unit 641, GPS unit 642, video unit 643, and multi-media controller 650 are equipped with the present invention's transmitter and receivers as shown in FIGS. 7 and 8.

Data bus 670 is shown as two conductors, but may be a single conductor. Data bus 670 can be a conductor such as a power wire, a shielded or unshielded wire, etc.

Master data base module 600 and multi-media controller 650 are the multiplexing and switching components of the data bus network.

Alternatively, the data bus network can be operated as an Ethernet.

The data bus network is protocol agnostic and use any protocol including, but not limited to, the Intelligent Transportation System Data Bus (ITSDB), and MIL-STD-1553 for military vehicles, aircraft, missiles, rockets etc.

In an alternative embodiment of a data bus network in an automobile, the sensors could be powered up by wireless radio frequency energy, similar to passive Radio Frequency Identification (RFID) technology, and connected to a data bus 670 which is the metallic portions of a vehicle, including the body, frame, engine, etc. In this embodiment, expensive wiring for power and signaling could be reduced, or eliminated.

Although a data bus network in an automobile or other vehicle is illustrated in FIG. 6, one skilled in the art will recognize that data bus networks for an application such as a SCADA (Supervisory Control and Data Acquisition) application, such as, but limited to Controller Area Network Bus (CAN). In these embodiments the data bus 670 could be unique guided mediums such as, but not limited to, structural steel in a building, or the drill stem in a drilling rig application, etc.

FIG. 7 is a block diagram of a transmitter according to one embodiment of the present invention. FIG. 8 is a block diagram of a receiver according to one embodiment of the present invention. The transmitter and receiver of the present invention consists of the following functional items including but not limited to configuration, systems operations and management, ultra wideband pulse generation, ultra wideband pulse train generation, signal processing including filtering and correlation, ultra wideband pulse synchronization, software management and configuration, feature control, Ethernet configuration, development and real-time debugging capabilities, and network switching and routing capabilities.

The transmitter and receiver can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.

FIG. 9 is a block diagram of a multiplexer. Multiplexer 900 is capable of combining two or more incoming data feeds A, B, and C onto a common transmission medium connected to I/O ports A, B, and C on line cards 904, 904', 904", and 904'". The multiplexer 900 is capable of time division, code, and/or frequency division multiplexing.

Multiplexer 900 is comprised of a control plane subsystem 901, data plane subsystem 902, trunk card 903 (only one is shown for clarity), and line cards 904, 904', 904", 904'". Line Cards 904, 904', 904", 904'" are comprised of transmitter 700 and receiver 800 as shown in FIGS. 7 and 8.

FIG. 10 illustrates the basic components of line interface device 361. The line interface device 361 is comprised of a transceiver, which is comprised of a transmitter 700 and receiver 800, ports for connecting to transmission mediums 1001, 1002, a port for connected to signal wire 1007, an optional processor 1010 and optional memory 1020. The line interface device's transceiver handles the transmission and receipt of data signals between a user's device, such as, but not limited to a PC, set-top box, etc. (not shown), and multiplexer 900 as shown in FIG. 9, FIGS. 3, 4, and 5 via transmission medium 1001. Transmission medium 1001 is a metallic guided medium such as, but not limited to, telephone twisted pair, coaxial cable, CAT-5 cable, power line, etc, but excludes fiber optic and wireless mediums.

A user connects a device (not shown) such as, but not limited to a PC, set-top box, or home networking router, to a port on the line interface device 361 via transmission medium 1002 in order to transmit and receive data from a remote source. The ports for transmission medium 1002 may include, but are not limited to an RJ-11 jack for telephone twisted pair, an RJ-45 jack for an Ethernet connection, IEEE 1394 Fire Wire connection, USB, RS-232, a PCMCIA slot, fiber optic, etc. The PCMCIA slot can be used as a wireless integration point for systems such as, but not limited to, Bluetooth, 802.11a, 802.11b, ultra wideband, etc. Only one port for transmission medium 1002 is shown for clarity, but the line interface device may be configured with any combination of additional ports as required.

A general description of the present invention, a description of a laboratory prototype, as well as a preferred embodiment, and alternative embodiments and aspects of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention, which is to be limited only by the claims, appended hereto.

What is claimed:

1. A method of data transmission, comprising:
   (a) receiving at least one stream of data;
   (b) encoding at least one bit with at least one pulse position data symbol;
   (c) serially transmitting the pulse position data symbols as ultra wideband impulses, comprising alternating counter pulses, over a hard-wired medium;
   (d) receiving the ultra wideband impulses;
   (e) recovering the pulse position data symbols from the ultra wideband impulses;
   decoding the ultra wideband impulse peaks to thereby provide decoded data;
   wherein the hard-wired medium is simultaneously used for wave based transmissions and transmission of the ultra wideband impulses; and
   wherein the ultra wideband signals are transmitted in a manner which is time independent of the wave based transmissions.

2. The method of claim 1 wherein the ultra wideband impulses having characteristics selected at least partially based on characteristics of the hard-wired medium.

3. The method of claim 2 wherein the hard-wired medium is a telecommunications line.

4. The method of claim 1 wherein the ultra wideband impulses are spectrally shaped.

5. The method of claim 1 wherein the ultra wideband impulses transmit data selected from a group consisting of: telephony data, high-speed data, digital video data, digital television data, Internet communication data, and audio data.

6. The method of claim 1 wherein the ultra wideband impulses are transmitted on a single frequency subcarrier channel over the hard-wired medium.

7. The method of claim 1 wherein the ultra wideband impulses are transmitted on at least two frequency subcarrier channels over the hard-wired medium.

8. The method of claim 1 wherein the ultra wideband impulse are multiplexed using a type of multiplexing selected from the group consisting of synchronous time division multiplexing, asynchronous time division multiplexing, code division multiplexing, and frequency division multiplexing.

9. The method of claim 1 wherein the at least one bit is 4 bits.

10. The method of claim 1 wherein the pulse position array has sixteen data symbols.

11. The method of claim 1 wherein the pulse position data symbols being constructed using a constant number of points.

12. A method of data transmission, comprising:
   (a) receiving at least one stream of data;
   (b) encoding at least one bit with at least one pulse amplitude data symbol;
   (c) serially transmitting the pulse amplitude data symbols as ultra wideband impulses, comprising alternating counter pulses, over a hard-wired medium;
   (d) receiving the ultra wideband impulses;
   (e) recovering the pulse amplitude data symbols from the ultra wideband impulses;
   (f) decoding the ultra wideband impulse peaks to thereby provide decoded data;
   wherein the hard-wired medium is simultaneously used for wave based transmissions and transmission of the ultra wideband impulses; and
   wherein the ultra wideband signals are transmitted in a manner which is time independent of the wave based transmissions.

13. The method of claim 12 wherein the ultra, wideband impulses having characteristics selected at least partially based on characteristics of the hard-wired medium.

14. The method of claim 12 wherein the hard-wired medium is a telecommunications line.

15. The method of claim 12 wherein the ultra wideband impulses are spectrally shaped.

16. The method of claim 12 wherein the ultra wideband impulses transmit data selected from a group consisting of: telephony data, high-speed data, digital video data, digital television data, Internet communication data, and audio data.

17. The method of claim 12 wherein the ultra wideband impulses are transmitted on a single frequency subcarrier channel over the hard-wired medium.

18. The method of claim 12 wherein the ultra wideband impulses are transmitted on at least two frequency subcarrier channels over the hard-wired medium.

19. The method of claim 12 wherein the ultra wideband impulse are multiplexed using a type of multiplexing selected from the group consisting of synchronous time division multiplexing, asynchronous time division multiplexing, code division multiplexing, and frequency division multiplexing.

20. The method of claim 12 wherein the at least one bit is 4 bits.

21. The method of claim 12 wherein the pulse amplitude array has sixteen data symbols.

22. The method of claim 12 wherein the pulse amplitude data symbols being constructed using a constant number of points.

* * * * *

UNITED STATES PATENT AND TRADEMARK OFFICE
CERTIFICATE OF CORRECTION

| | | |
|---|---|---|
| PATENT NO. | : 8,229,007 B2 | Page 1 of 1 |
| APPLICATION NO. | : 13/080020 | |
| DATED | : July 24, 2012 | |
| INVENTOR(S) | : Kennedy et al. | |

It is certified that error appears in the above-identified patent and that said Letters Patent is hereby corrected as shown below:

Col. 27, Line 41, Claim 1:
ADD before decoding --(f)--

Signed and Sealed this
Eleventh Day of September, 2012

David J. Kappos
*Director of the United States Patent and Trademark Office*